(12) United States Patent
Parker

(10) Patent No.: US 9,738,205 B2
(45) Date of Patent: Aug. 22, 2017

(54) LIFT SYSTEM WITH REMOVABLE CART

(71) Applicant: Peter M. Parker, Baraboo, WI (US)

(72) Inventor: Peter M. Parker, Baraboo, WI (US)

(73) Assignee: Peter M. Parker, Baraboo, WI (US)

( * ) Notice: Subject to any disclaimer, the term of this patent is extended or adjusted under 35 U.S.C. 154(b) by 0 days.

(21) Appl. No.: 14/997,029

(22) Filed: Jan. 15, 2016

(65) Prior Publication Data

US 2016/0129825 A1    May 12, 2016

Related U.S. Application Data

(63) Continuation-in-part of application No. 14/097,944, filed on Dec. 5, 2013, now Pat. No. 9,403,469.

(60) Provisional application No. 62/125,301, filed on Jan. 20, 2015, provisional application No. 62/176,379, filed on Feb. 17, 2015.

(51) Int. Cl.
*B60P 1/44* (2006.01)
*B62B 3/04* (2006.01)

(52) U.S. Cl.
CPC .......... *B60P 1/4414* (2013.01); *B60P 1/4407* (2013.01); *B60P 1/4485* (2013.01); *B62B 3/04* (2013.01)

(58) Field of Classification Search
CPC ......... B60P 1/4414; B60P 1/44; B60P 1/4442; B60P 1/4457; A61G 3/0218; A61G 3/02; A61G 3/06; A61G 3/0236; A61G 3/0816
See application file for complete search history.

(56) References Cited

U.S. PATENT DOCUMENTS

| | | | | |
|---|---|---|---|---|
| 2,456,805 A | * | 12/1948 | Wohlforth | B60P 1/4414 414/545 |
| 2,525,424 A | * | 10/1950 | Novotney | B60P 1/4414 414/557 |
| 3,057,491 A | * | 10/1962 | Schlensker | B60P 1/4414 414/557 |
| 3,451,572 A | * | 6/1969 | Rossoni | B60P 1/4414 414/498 |
| 3,931,903 A | * | 1/1976 | Johnson | B60R 9/10 414/462 |
| 4,147,261 A | * | 4/1979 | Dautel | B60P 1/4478 414/557 |
| 4,593,840 A | * | 6/1986 | Chown | B60R 9/06 224/484 |
| 4,780,044 A | * | 10/1988 | Elskamp | B60P 1/4414 414/557 |
| 4,898,510 A | * | 2/1990 | Weber | B60P 1/4414 414/557 |
| 5,100,282 A | * | 3/1992 | Maier | B60P 1/4414 414/545 |
| 5,277,275 A | * | 1/1994 | Ablabutyan | B60P 1/4414 187/272 |
| 6,164,895 A | * | 12/2000 | Croswell | B60P 1/4485 414/462 |

(Continued)

*Primary Examiner* — Kaitlin Joerger
(74) *Attorney, Agent, or Firm* — Quarles & Brady LLP

(57) ABSTRACT

A lift assembly for a vehicle is described. The lift assembly can includes a hitch assembly for removable attachment to the vehicle, and first and second support members rotatably secured to the hitch assembly. As a lifting mechanism mounted to the hitch assembly provides a lifting force to one of the support members, the platform assembly can be raised from a lowered position to a raised position. The lift assembly can be removably engaged with a cart.

18 Claims, 23 Drawing Sheets

(56) References Cited

U.S. PATENT DOCUMENTS

| | | | |
|---|---|---|---|
| 6,183,187 B1* | 2/2001 | Ablabutyan | B60D 1/02 187/272 |
| 7,905,508 B2* | 3/2011 | Crawford | B60D 1/00 224/519 |
| 2006/0118586 A1* | 6/2006 | Heravi | B60R 9/0426 224/519 |
| 2008/0138183 A1* | 6/2008 | Lin | B60P 1/4421 414/546 |
| 2010/0124479 A1* | 5/2010 | Brooks | B60P 1/4471 414/557 |
| 2014/0079517 A1* | 3/2014 | Ablabutyan | B60P 1/445 414/546 |
| 2015/0050107 A1* | 2/2015 | Kipp | B60P 1/02 414/462 |
| 2015/0217670 A1* | 8/2015 | Ablabutyan | B60P 1/445 414/546 |

* cited by examiner

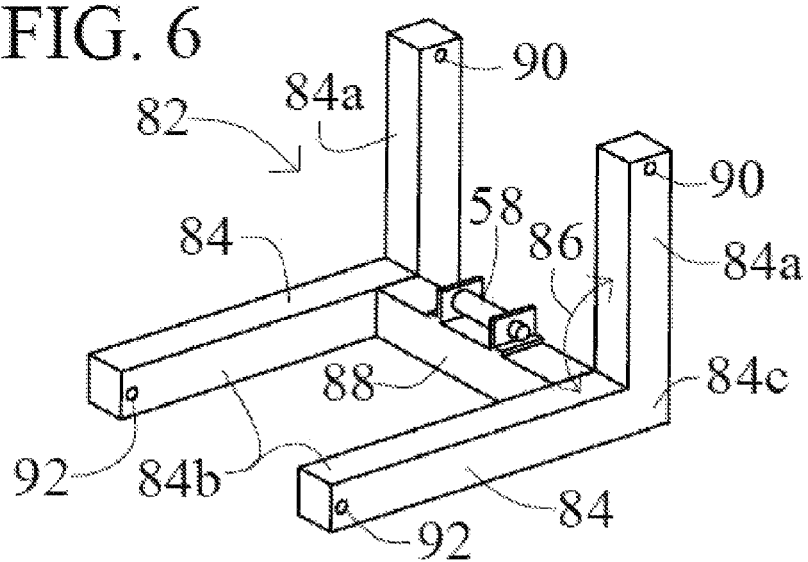
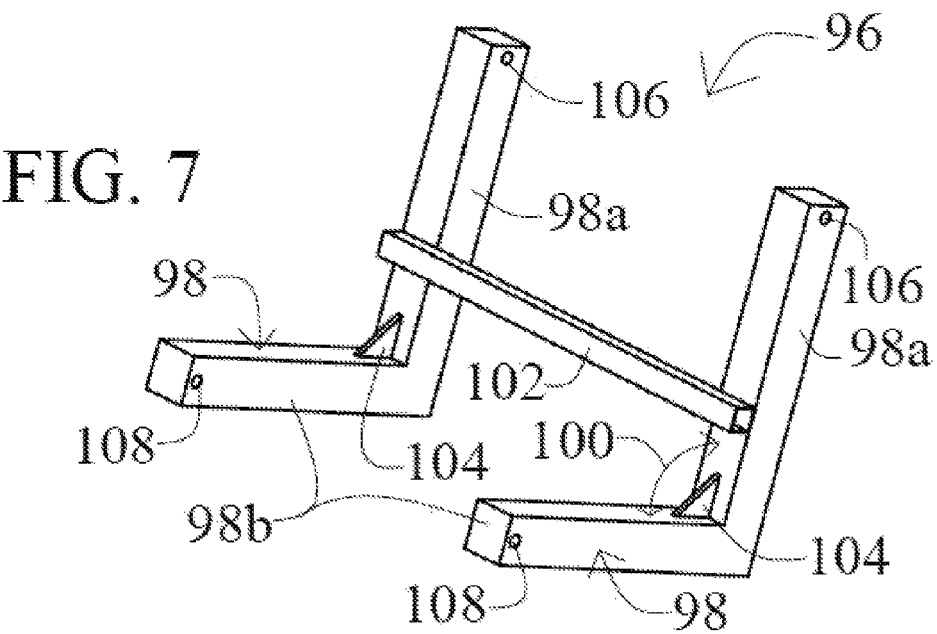

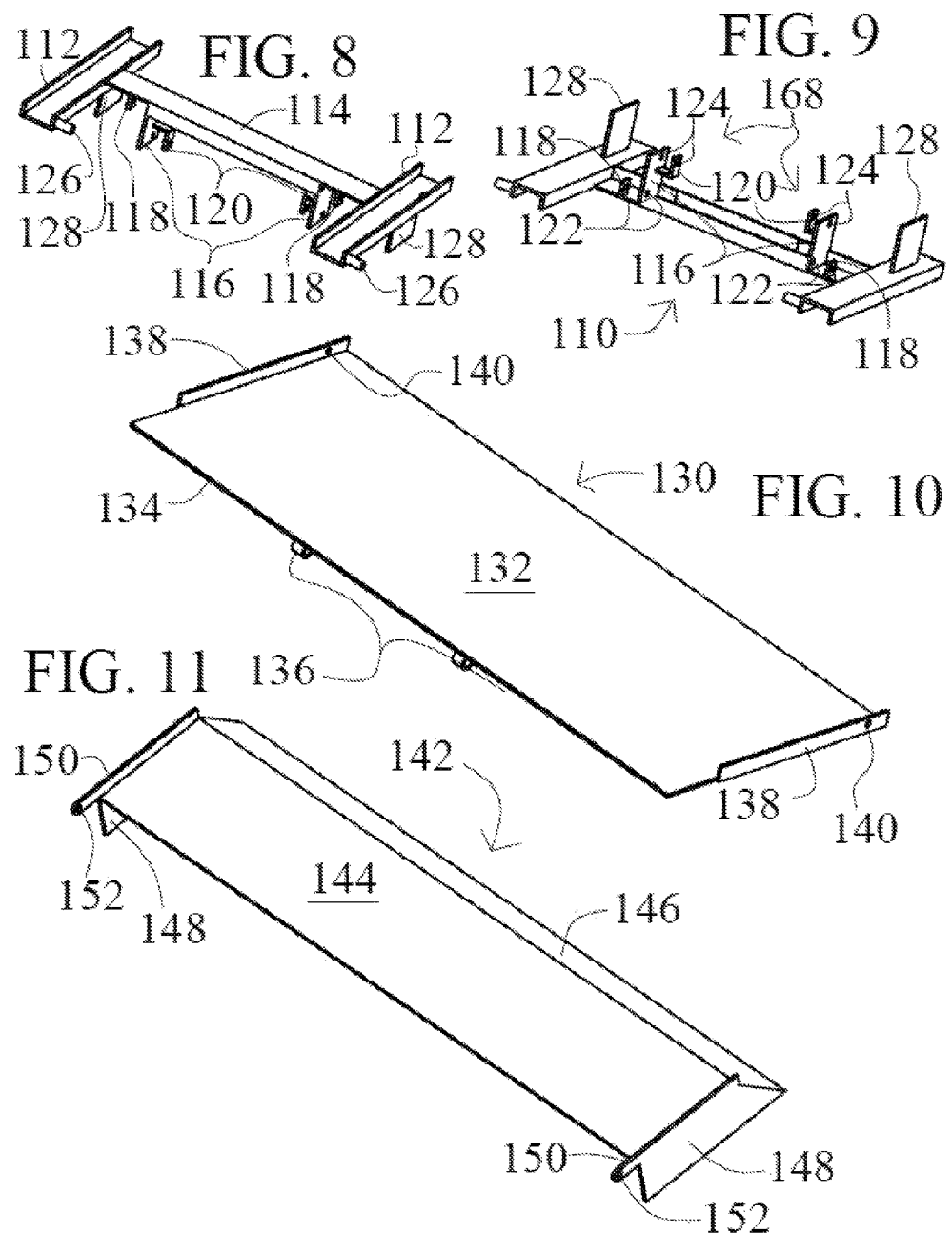

LIFT SYSTEM WITH REMOVABLE CART

CROSS-REFERENCE TO RELATED APPLICATION(S)

This application is a continuation-in-part of U.S. application Ser. No. 14/097,944, filed Dec. 5, 2013, and also claims priority to U.S. Provisional Application 62/125,301 filed Jan. 20, 2015 and U.S. Provisional Application 62/176,379 filed Feb. 17, 2015. Each of these applications are hereby incorporated by reference in their entirety.

STATEMENT OF FEDERALLY SPONSORED RESEARCH OR DEVELOPMENT

Not applicable.

FIELD OF THE DISCLOSURE

This disclosure relates to lifting and moving objects and materials, including the lifting and moving of objects and materials in order to load and unload various vehicles.

BACKGROUND OF THE DISCLOSURE

It is well known that various activities may require the transport of heavy objects or materials using various types of vehicles. In various instances, for example, consumer vehicles such as pick-up trucks may be used to transport heavy loads between locations, with users loading and unloading heavy objects and materials into and out of the cargo beds of the trucks.

It is also well known that loading objects and materials into cargo beds may represent a difficult task, particularly for heavy objects and materials. For example, with respect to consumer pick-up trucks, the cargo bed may be several feet above the ground. As such, lifting objects and materials from the ground into such a cargo bed (or other cargo area) may require significant expenditure of energy, as may lowering the objects and materials after transport. Indeed, for particularly heavy loads, this lifting and lowering may not be possible without machine assistance. Similarly, transport of heavy objects and materials to and from loading locations can require significant expenditure of energy and may not be possible without mechanical assistance.

SUMMARY OF THE DISCLOSURE

A lift system is disclosed for lifting and moving objects and materials, including with respect to a vehicle compartment such as a pick-up truck bed.

According to one aspect of the disclosure, a hitch assembly can be configured for removable attachment to a vehicle. A first support member can include a first upper section rotatably secured to the hitch assembly, and a second support member can include a second upper section rotatably secured to the hitch assembly. A platform assembly can be secured at a first pivot location to a first lower section of the first support member, and secured at a second pivot location to a second lower section of the second support member. A lifting mechanism can be configured to transmit lifting force to at least one of the first support member and the second support member to move the platform assembly from a lowered, platform-loading position to a raised, vehicle-loading position.

A front stabilizer can be at least one of: secured to an upper side of at least one of the first support member and the second support member, the front stabilizer being disposed to contact the platform assembly forward of the first pivot location and the second pivot location to urge a forward portion of the platform assembly in an upward direction as the platform assembly approaches the platform-loading position; and secured to a location on the platform assembly that is forward of at least one of the first pivot location and second pivot location, the front stabilizer being disposed to contact at least one of the first support member and the second support member to urge the forward portion of the platform assembly in an upward direction as the platform assembly approaches the platform-loading position.

A rear stabilizer can be at least one of: secured to a lower side of at least one of the first support member and the second support member, the rear stabilizer contacting the platform assembly rearward of the first pivot location and the second pivot location to urge the forward portion of the platform assembly in a downward direction as the platform assembly approaches the vehicle-loading position; and secured to a location on the platform assembly that is rearward of at least one of the first pivot location and the second pivot location, the front stabilizer contacting at least one of the first support member and the second support member to urge the forward portion of the platform assembly in a downward direction as the platform assembly approaches the vehicle-loading position.

According to another aspect of the disclosure, a hitch assembly can be configured for removable attachment to a vehicle. A first support member can include a first upper section rotatably secured to the hitch assembly. A second support member can include a second upper section rotatably secured to the hitch assembly. A platform assembly can be secured at a first pivot location to a first lower section of the first support member, and secured at a second pivot location to a second lower section of the second support member. A lifting mechanism can be configured to transmit lifting force to at least one of the first support member and the second support member to move the platform assembly from a lowered, platform-loading position to a raised, vehicle-loading position. A cart can be configured to support a load and to removably engage the platform assembly, such that moving the platform assembly from the platform-loading position to the vehicle-loading position raises the cart and the load.

According to still another aspect of the disclosure, a hitch assembly can be configured for removable attachment to a vehicle. A first support member can include a first upper section rotatably secured to the hitch assembly. A second support member can include a second upper section rotatably secured to the hitch assembly. A platform assembly can be secured at a first pivot location to a first lower section of the first support member, and secured at a second pivot location to a second lower section of the second support member. A lifting mechanism can be configured to transmit lifting force to at least one of the first support member and the second support member to move the platform assembly from a lowered, platform-loading position to a raised, vehicle-loading position. The platform assembly can include a platform base, and a platform for the load, the platform being configured to be removably and rotatably secured to the platform base. With the platform removably and rotatably secured to the platform base, and with the platform assembly in the vehicle-loading position, the platform can pivot upward from a support position for the load to provide a gate for the vehicle. With the platform removed from the platform base, the platform base can provide a first support surface for lifting the cart.

The details of one or more implementations of the disclosure are set forth in the accompanying drawings and the description below. Other features and advantages will become apparent from the description, the drawings, and the claims.

BRIEF DESCRIPTION OF THE DRAWINGS

FIG. 6 is perspective view of a first support member of the example lift of FIG. 1;

FIG. 7 is a perspective view of a second support member of the example lift of FIG. 1;

FIG. 8 is an upper perspective view of a platform base included in a platform assembly of the example lift of FIG. 1;

FIG. 9 is a lower perspective view of the platform base of FIG. 8;

FIG. 10 is a perspective view of a load-bearing platform included in a platform assembly of the example lift of FIG. 1;

FIG. 11 is a perspective view of a loading ramp for the load-bearing platform of FIG. 10;

Like reference numerals in the drawings indicate like components, parts, or operations.

DETAILED DESCRIPTION

Figure 1:
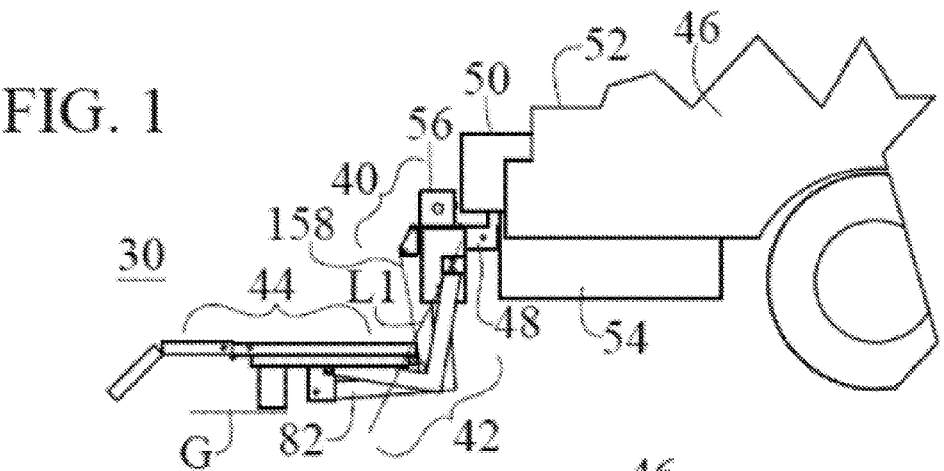
FIG. 1 is a side view of an example lift mounted to a pick-up truck and in a platform-loading position.

The following describes one or more example implementations of the disclosed system and method, as shown in the accompanying figures of the drawings described briefly above. As will be clear from the discussion below, various embodiments of the disclosed lifts may be mounted to the rear of a vehicle (e.g., via a rear hitch receiver) for loading of the vehicle via a lifting motion that is generally aligned with the major front-to-back axis of the vehicle. For convenience, the words "forward," "front," "rear," "rearward" and so on will be used with respect to a lift placed in this orientation (i.e., mounted to the rear of a vehicle, with a lifting motion generally aligned with the front-to-back axis of the vehicle). As such, for example, "forward" may refer to a direction that is toward the front of the vehicle (and lift) in the above configuration and "rearward" may refer to a direction that is away from the front of the vehicle (and lift) in the above configuration. Likewise, unless otherwise clarified, "horizontal" may be used below to refer to an orientation that is parallel with the major front-to-back axis of a relevant vehicle. As such, for example, with respect to a vehicle located on flat ground, "horizontal" may refer to a true horizontal orientation (i.e., an orientation parallel to the flat ground). Finally, the term "opposite" may be used to refer to an orientation that is generally opposed, but not necessarily exactly opposed to a reference location. For example, a location that is "opposite" a central point, with respect to a reference point may generally be on the opposite side of the central point from the reference point, but may not necessarily be the same distance from (or above or below) the central point as the reference point.

As discussed in greater detail herein, it may be useful to provide a lift that may allow for loading and unloading of large or heavy loads into and out of various vehicles. It may also be useful to provide a portable lift that may be easily attached to existing vehicle components (e.g., standard hitch receivers) in order to allow the lift to be used with a variety of vehicle types without requiring substantial user adjustments. In particular, it may be useful to provide a lift that may be mounted to a variety of consumer vehicles, such as pick-up trucks, in a relatively short time and with relatively little effort, which lift may then provide a stable lifting platform for a variety of objects and materials.

To date, a variety of lifts have been provided for loading vehicles, including pick-up trucks. Some of these lifts, for example, utilize known parallel linkage architectures to maintain a load-bearing platform in a horizontal orientation during a lifting operation. The range of lifting motion for these lifts, however, tends to be limited because of the nature of the parallel linkage designs currently employed. In general, current lift designs do not facilitate lifting a loading platform to a position that is above or forward of the source of lifting power, with respect to the orientation of the relevant vehicle. Further, existing designs may tend to be unstable when away from a central portion of the range of possible motion, which may lead to further limitations on the lifts' range of useful lifting motion as well as the maximum rated load. Various available lifts, for example, may be capable of stable operation only within a 90-degree (or smaller) range of motion and only with loads of 500 pounds or less. These may represent significant limitations with respect to lift utility.

In certain embodiments, the lifts disclosed herein (and the various components thereof) may introduce significant improvements with respect to the issues noted above (and various others). In certain embodiments, the disclosed lifts may be easily mounted to the hitch receiver of a variety of existing vehicles without the need to change parts or make difficult adjustments. Through the use of an innovative support member configuration, the lifts may facilitate lifting of weights of 1,500 pounds or more over an extended range of motion, with significant platform stability. The disclosed lifts may also maintain a load-bearing platform at an horizontal orientation (e.g., substantially parallel with the ground or a cargo bed of a relevant vehicle), or other orientation, over a substantial portion of a lifting operation, and may exhibit a range of motion for the lifting platform that extends from below and behind to above and forward of the source of lifting power. This may be facilitated by an innovative support structure and may, for example, both help to maintain loads in a more stable state over the full course of a lifting operation and allow for easier loading of even very heavy objects.

In certain embodiments, a hitch assembly included in a lift may include a hitch receiver insert that may be secured in a standard hitch receiver of a consumer vehicle through various known means (e.g., through a locked pin). The hitch assembly may also include a lifting mechanism such as an electrically powered winch, hydraulic cylinder, electronic actuator, and so on.

The lift may include at least two elbowed support members. One end of each of the support members may be rotatably mounted to the hitch assembly, with the other end of each of the members being rotatably mounted to the underside of a separate platform assembly. The distance between the mounting points at the opposite ends of one of the support members (e.g., the hypotenuse of an L-shaped support member) may be the same as the distance between the mounting points at the opposite ends of the other support members. Likewise, the distance between the two mounting locations (for the support arms) on the hitch assembly may be the same as the distance between the two mounting locations (for the support arms) on the platform assembly. In this way, an effective parallel linkage may be implemented via the support members and the rotatable mounts of the support members to the hitch and platform assemblies. This may allow a platform included on the platform assembly to be lifted in a generally horizontal (or other) orientation from a platform-loading position (e.g., with the support members fully lowered) and a vehicle-loading position (e.g., with the support members fully raised).

Notably, the use of elbowed (or similar) configuration for the support members may facilitate an expanded range of motion for a lifting operation using the described lift. For example, in certain embodiments the front edge of the lifting platform may be behind and below the lifting mechanism when in a platform-loading position (e.g., when the lift is fully or nearly-fully lowered for loading from the ground) and may be above and in front of the lifting mechanism when in a vehicle-loading position (e.g., when the lift is fully or nearly-fully raised for unloading of the platform onto the vehicle). In this way, for example, the front edge of the lifting platform may be beneficially lifted from a location that is below and behind the vehicle bumper (i.e., in a platform-loading position) to a location that is above and in front of the vehicle bumper (i.e., in a vehicle-loading position), which may facilitate easy loading (or unloading) of the vehicle. (It will be understood, despite the naming convention described above, that a lift platform may be loaded from the vehicle in the vehicle-loading position and may be unloaded onto the ground in the platform-loading position.)

The configuration described above may further facilitate keeping the load being lifted relatively close to the body of the vehicle, versus conventional lift designs, thereby increasing lifting stability. For example, with generally L-shaped support members, the support members may be mounted to the platform assembly rearward of the front of the platform assembly (e.g., near a front-to-rear midpoint of the platform assembly). At a lowered position, the platform assembly may then actually rest on the lower leg(s) of the "L" of the support members, thereby increasing stability at the platform-loading position. Moreover, as a lifting operation is begun, this rearward mounting of the support members may also beneficially locate the weight to be lifted relatively closely to the vehicle and to the lifting mechanism (which may be mounted to the hitch assembly that is mounted to the vehicle). This may allow for lifting of greater loads with a given lifting mechanism (e.g., a winch of a particular rating) and may result in less vehicle movement (e.g., sagging into the vehicle's rear shocks) as the lift is operated.

Figure 2:
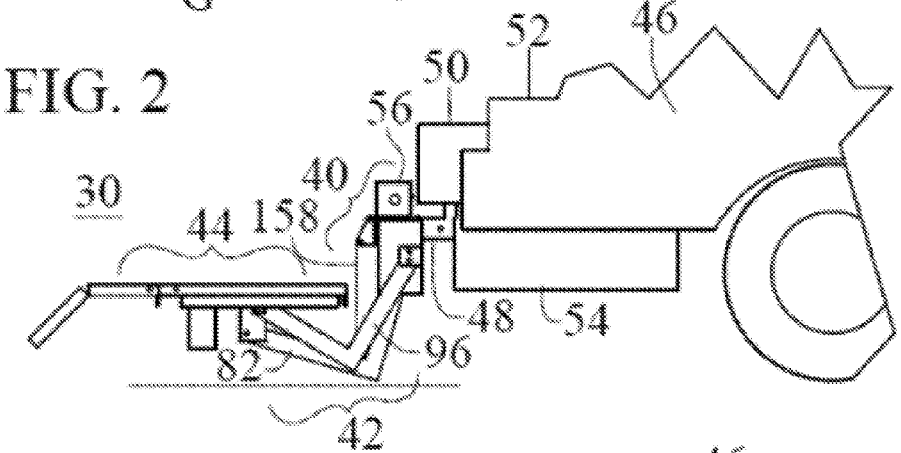
FIG. 2 is a side view of the example lift of FIG. 1, during a lifting operation.
Figure 3:
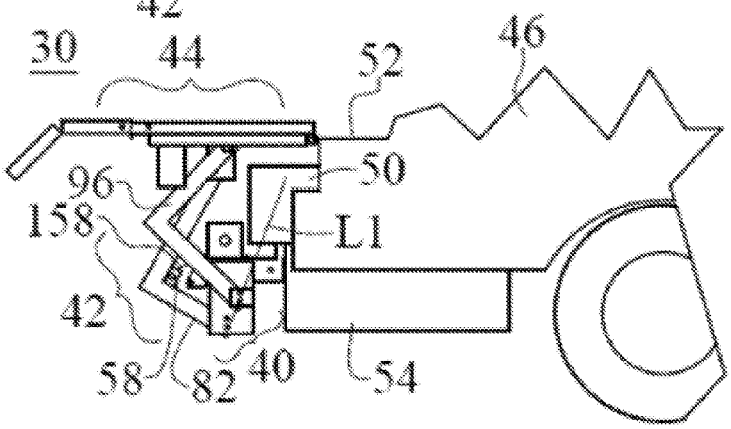
FIG. 3 is side view of the example lift of FIG. 1, in an vehicle-loading position.

Referring now to FIGS. 1-3, various side views are presented of an example lift contemplated by this disclosure. As can be seen in FIGS. 1-3, a lift 30 may include a hitch assembly 40, a support assembly 42 and a platform assembly 44, each of which will be discussed in greater detail below. The lift 30 may be mounted to the vehicle 46 for operation. The vehicle 46 may, for example, be a consumer pick-up truck having standard 2-inch hitch receiver 48 located below a bumper 50 and a cargo bed 52. Various underbody extensions, such as a spare tire 54 or tube stock extending from the hitch receiver 48 (not shown) may also be included in the vehicle 46. It will be understood, based on the discussion herein, that a contemplated lift (e.g., the lift 30) may be configured for use with a variety of vehicle types and configurations. For example, the lift 30 may be configured for use with a variety of consumer pick-up trucks or other hitch-equipped vehicles, even though these trucks or other vehicles may exhibit various heights between the bed 52 and the ground (indicated as "G" in the various figures) or between the hitch receiver 48 and the ground. For example, in certain embodiments, the same lift 30 may be used, without modification, with trucks having heights of 30.5 to 36.5 inches between the bed 52 and the ground, trucks having heights of 16 to 21 inches between the center of the hitch receiver 48 and the ground, and trucks having heights of 14 to 18 inches between the center of the hitch receiver 48 and the bed 52.

In FIG. 1, the lift 30 is depicted in (or near) a platform-loading position. In a platform-loading position, the lift 30 may be lowered such that various portions of the lift 30 (e.g., base supports 128) are supported by the ground, thereby allowing the platform assembly 44 to be loaded with a load to be lifted. In FIG. 2, a winch 56 (or another lifting mechanism) has been activated, causing the support assembly 42 to begin to lift the platform assembly 44 with respect to the hitch assembly 40. For example, a cable or strap from the winch 56 (e.g., a cable/strap 158) may be connected to an anchor 58 on the support assembly 42 in order to transmit lifting force to the support assembly 42. It can be seen that as the platform assembly 44 is lifted from the orientation of FIG. 1 (e.g., a platform-loading orientation) to the orientation of FIG. 2, it maintains a relatively horizontal load-bearing surface, due to the effective parallel linkage of the support assembly 42. (As used herein, "cable" may refer to a generally cable-, rope-, or cord-like component for transmitting pulling (e.g., lifting) force and "strap" may refer to a generally flat or otherwise strap-like component for transmitting pulling (e.g., lifting) force.)

Continuing, in FIG. 3, the lift 30 may have been fully lifted to a vehicle-loading position, in which a front edge of the platform assembly 44 is in contact with the cargo bed 52 (or suitably near the cargo bed 52 for transfer of loads between the platform assembly 44 and the bed 52). As in FIG. 2, it can be seen that the platform assembly 44 continues to maintain a horizontal (or other) orientation for the load-bearing platform, even though the front edge of the platform assembly 44 has been lifted above and in front of the winch 56 (from behind and below the winch).

Figure 4:
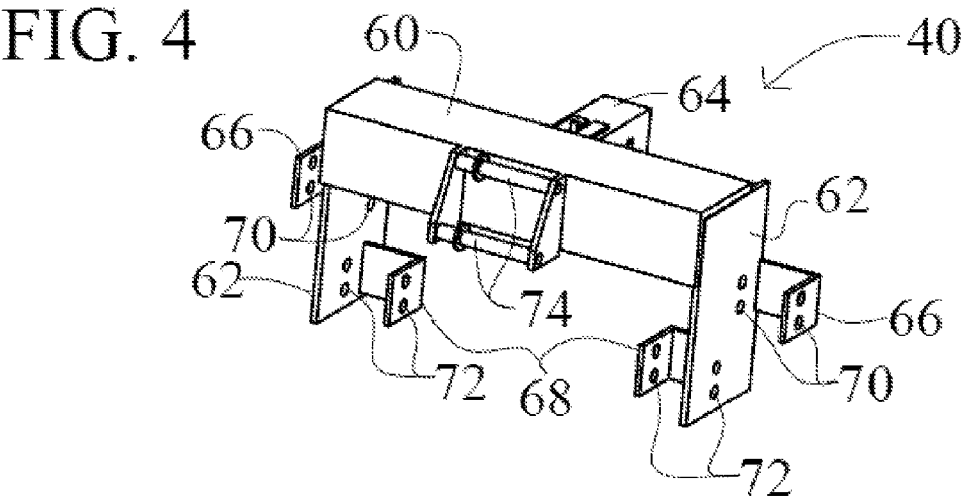
FIG. 4 is a perspective view of a hitch assembly of the example lift of FIG. 1.
Figure 5:
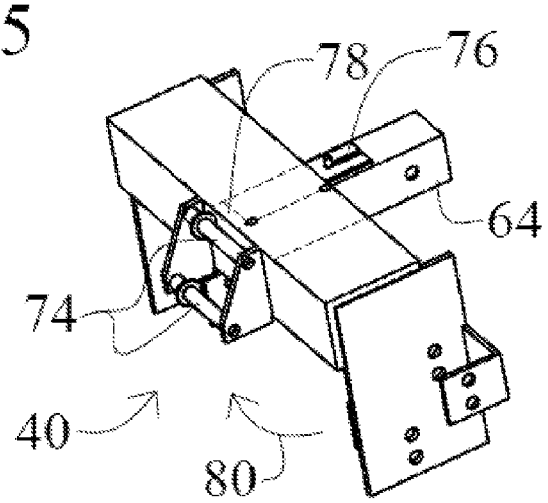
FIG. 5 is another perspective view of the hitch assembly of FIG. 4.

Referring also to FIGS. 4 and 5, one embodiment of the hitch assembly 40 is presented. The hitch assembly 40 may include, for example, a top surface 60 and side supports 62 as well as a hitch receiver tube 64 or other known means (e.g., other inserts) for securely connecting the hitch assembly 40 to the vehicle 46. As depicted, for example, the hitch receiver tube 64 may be configured to be slid into a hitch receiver (e.g., the standard hitch receiver 48) of the vehicle 46. The hitch receiver tube 64 may then, for example, be pinned (or otherwise fixed) into place in order to anchor the lift 30 with respect to the vehicle 46 in order to provide a base for lifting operations. As also noted above, the lift 30 may be configured with appropriate dimensions such that the hitch receiver tube 64 may be easily inserted into a hitch receiver of a variety of vehicles and configurations, including without requiring the lift 30 to be lifted off the ground for the insertion.

As also noted above, the support assembly 42 may be rotatably secured to the hitch assembly 40 in order to facilitate lifting operations. As such, the hitch assembly 40 and the support assembly 42 (as discussed in greater detail below) may include various complementary connection means. For example, the hitch assembly 40 may include outer support tabs 66 with various pin-receiving holes 70, as well as inner support tabs 68 with various pin-receiving holes 72. Corresponding pin-receiving holes 70, 72 may also be provided in the side supports 62, to facilitate secure anchoring of inserted pins in order to provide a rotatable connection. As depicted, the support tabs 66 and 68 may each include multiple pin-receiving holes 70, 72 in order to facilitate manual adjustment of the connection between the support assembly 42 and the hitch assembly 40. In certain embodiments, a greater or fewer number of the pin-receiving holes 70, 72 may alternatively be provided. For example, under a standardized configuration, the lift 30 may be suitable for mounting to and operation with vehicles having a range of bed and hitch receiver heights, without the need to provide multiple pin-receiving holes 70, 72 for adjustment. (It will be understood that although many examples herein discuss the use of pinned connections, various other connection types of similar effect—e.g., a rotatable connection—may be utilized in various embodiments.)

The hitch assembly 40 may include a lifting mechanism, such as a winch (not shown in FIGS. 4 and 5). In certain embodiments, an electrically driven lifting mechanism may be utilized, such as an electric winch. In this way, power may be easily provided to the lifting mechanism from the vehicle 46. For example, to provide power for a lifting operation, a user may simply connect the lifting mechanism to a power cable from the vehicle 46 (e.g., a standard 12V connecting cable) once the hitch assembly 40 is mounted to the vehicle 46. The hitch assembly 40 may further include one or more hitch assembly rollers 74, which may guide a cable, strap or other connecting device that extends from the lifting mechanism in order to provide lifting force to the support assembly 44.

It will be understood that vehicle hitch receivers (e.g., the hitch receiver 48) may be manufactured with varying tolerances with respect to a nominal size. This may be desirable from a general perspective as larger tolerance between the inner walls of a hitch receiver and the outer walls of a hitch receiver insert may allow for easy insertion of the insert as well as prevent the insert from binding in the receiver. This larger tolerance, however, may detrimentally affect lifting operations as it may allow the receiver tube 64 to wobble within the receiver 48, thereby causing the platform assembly 44 (and a load resting thereupon) to also wobble. In order to address this issue, the hitch assembly 40 may further include one or more of a shim 76 and an offset spacer 78. As needed, depending on the actual tolerance between the receiver 48 and the tube 64, the shim 76 or the spacer 78 may be utilized to provide an improved fit between the receiver 48 and the tube 64 and thereby prevent excessive wobble (e.g., in the direction of arrow 80).

Referring also to FIG. 6, various components of the support assembly 42 are presented. As depicted in FIG. 6, for example, square tubing stock may be utilized to form inner support legs 84 of inner leg assembly 82. Each of the support legs 84 may include an upper section 84a as well as a lower section 84b, which may be joined by an elbow 84c. As will become apparent from the discussion herein, the orientation of the upper sections 84a at an angle 86 with respect to the lower sections 84b may facilitate the extended range of lifting motion that is possible with the lift 30. It will be understood, however, that such an angled orientation may be maintained without requiring a particular measurement for the angle 86. For example, the angle 86 may be equal to, more, or less than 90° in various embodiments. Similarly, one or both sides of the support legs 84 may be formed from curved stock, such that a portion of the upper section 84a may be oriented at an angle with respect to a portion of the lower section 84b without necessarily requiring an angle at the elbow 84c.

As also noted throughout this disclosure, in certain embodiments various components of the support assembly 42 (e.g., the support legs 84 (see above) or support legs 98 (see below)) may be configured as generally L-shaped components. It will be understood that an L-shaped component may include two legs joined to each other at an approximately 90° angle. A generally L-shaped component may generally conform with the shape of an L-shaped component, but may exhibit additional features (e.g., additional extensions, protrusions, legs and so on), may exhibit a joining angle between the two legs of more or less than a 90° angle, and so on.

It will also be understood that while the support legs 84 and various other components discussed herein may be described as being formed from particular materials (e.g., square tubing stock, c-bar stock, and so on), other configurations and constructions may be possible, in keeping with this disclosure. For example, solid bar stock, various tubing types, i-bar stock, or other stock or material may be utilized. Likewise, it will be understood that the support legs 84 (or various other portions of the lift 30) may be formed as integral pieces (e.g., though casting) or as combinations of distinct components (e.g., via welding, bolted connections, and so on), with the word "assembly" being used generally herein to refer to both of these possible construction approaches.

The support legs 84 may include various mechanisms or features to allow for the rotatable connection of the support legs 84 to both the hitch assembly 40 and the platform assembly 44. For example, the support legs 84 may include pin-receiving holes 90 that may be configured to align with the pin-receiving holes 70 of the hitch assembly 40 when the upper end of the upper section 84a is inserted between the outer support tabs 66 and the side walls 62 of the hitch assembly 40. Similarly, pin-receiving holes 92 may be included for rotatable connection of the lower section 84b of the support legs 84 to the platform assembly 44.

In certain embodiments, the support assembly 42 may include one or more of the anchors 58 at which a strap or cable (or other force transmitting means) from the lifting mechanism (e.g., the winch 56) may connect to the support assembly 42. As depicted in FIG. 6, for example, the anchor 58 may include one or more support assembly rollers, which may be mounted on the cross support 88 between the two support legs 84. It will be understood, however, that other configurations may be possible. For example, an anchor point (e.g., rollers for a cable or strap) may be mounted to the sides of the support legs 84 rather than on the cross support 88. Similarly, an anchor point may be include on the support legs 98 (e.g., FIG. 7 (anchor point not shown)) rather than (or in addition to) being mounted on the support legs 84. In certain embodiments, the anchor 58 may be configured to form part of a pulley arrangement, which may facilitate use of lower rated lifting mechanisms for larger loads. For example, the anchor 58 may be configured (as shown) to include one or more support assembly roller which, together with the hitch assembly rollers 74 (e.g., as in FIG. 5), may form a pulley assembly to multiply the lifting force of the winch 56. It will be understood, in this context, that such "rollers" may not necessarily rotate (or otherwise move), although they may contribute to various beneficial effects of a pulley arrangement, such as force multiplication. It will further be understood that various alternative pulley arrangements may be possible, as may be selected based upon considerations including the visibility of a strap or cable as it passes through a pulley arrangement (e.g., for inspection to identify proper functioning, wear on the strap or cable, and so on).

In certain embodiments, the orientation of the anchor 58 (e.g., configured to include support assembly rollers) may also contribute in other ways to the enhanced lifting power and range of motion of the disclosed lift. For example, in FIG. 6 it can be seen that the support assembly rollers 58 are mounted relatively closely to the elbow 84c of the inner support legs 84. Referring also back to FIGS. 1-3, it can be seen that such an orientation may ensure that a cable or strap (or other connection) extending between the hitch assembly roller 74 (or the winch 56) and the support legs 84 does not interfere with the platform assembly 44. Further, as can also be seen in FIGS. 1-3, such an orientation of the support assembly rollers 58 may ensure that lifting force may be provided to the support legs 84 (and thereby also to the platform assembly 44) over the full range of motion from the platform-loading position of FIG. 1 to the vehicle-loading position of FIG. 3, even though the platform assembly 44 may be lifted above the hitch assembly roller 74 (and the winch 56) in order to reach the vehicle-loading position.

Referring also to FIG. 7, various additional components of the support assembly 42 are presented. For example, the lift 30 may also include the outer support legs 98 on an outer leg assembly 96. As depicted in FIG. 7, for example, square tubing stock may be utilized to form the outer support legs 98. Each of the support legs 98 may include an upper section 98a as well as a lower section 98b, which may be joined by an elbow 98c. As will become apparent from the discussion herein, the orientation of the upper sections 98a at an angle 100 to the lower sections 98b facilitates the extended range of lifting motion that is possible with lift 30. It will be understood, however, that such orientation may be maintained without requiring a particular measurement for the angle 100. For example, the angle 100 may be equal to, more, or less than 90° in various embodiments. Similarly, one or both sides of the support legs 98 may be formed from curved stock, such that a portion of the upper section 98a is oriented at an angle with respect to a portion of the lower section 98b without necessarily requiring an angle at the elbow 98c.

As with the inner support legs 84, the outer support legs 98 may include various mechanisms or features to allow for rotatable connection of the support legs 98 to the hitch assembly 40 and the platform assembly 44. For example, the support legs 98 may include pin-receiving holes 106 that may be configured to align with the pin-receiving holes 72 of the hitch assembly 40 when the upper end of the upper section 98a is inserted between the inner support tabs 68 and the side walls 62 of the hitch assembly 40. Similarly, pin-receiving holes 108 may be included for rotatable connection of the lower section 98b of the support legs 98 to the platform assembly 44.

As also noted above, in order to assist in maintaining a horizontal (o other) orientation of the platform assembly 44 during a lifting operation, the support legs 84 and 98 may act as members of an effective parallel linkage. As such, in certain embodiments, the distance between opposite ends of the respective support legs 84 and 98 may be equal. For example, the distance between the pin-receiving holes 90 and 92 on one of the support legs 84 may be equal to the distance between the pin-receiving holes 106 and 108 on one of the support legs 98. (It will be understood that due to the nature of manufacturing and component assembly, some variation in parts may occur. In this regard, with respect to the discussion herein, a distance may be considered as "equal" to another (or the "same" and so on) so long as the distances are approximately equal.)

Referring also to FIGS. 8 and 9, upper and lower perspective views of a platform base 110 of the platform assembly 44 are presented. The platform base 110 may, for example, provide a connection point (or points) for the legs 84 and 98 of the support assembly 42, as well as structural support for a load-bearing platform (not show in FIGS. 8 and 9). The platform base 110 may include, for example, support members 112 arranged parallel to the major axis of vehicle 46 (i.e., parallel to the hitch receiver tube 64), and a cross support 114 connecting the support members 112. The support members 112 are depicted as being formed from c-stock (in various orientations). It will be understood, however, that other configurations (and orientations) may be possible.

The platform base 110 may also include various mechanisms or features to allow for rotatable connection of the support legs 84 and 98 to the platform assembly 44. For example, the platform base 110 may include pin supports 116 extending downward from the support members 112, with outer support tabs 118, inner support tabs 120, and various pin-receiving holes 122 and 124. When the ends of the lower sections 84b of the support legs 84 are inserted between the inner support tabs 120 and the pin support 116, the pin-receiving holes 92 and 124 may be aligned, allowing for a pinned connection (or other rotatable connection) between the platform base 110 and the support legs 84. Likewise, when the ends of the lower sections 98b of the support legs 98 are inserted between the outer support tabs 118 and the pin support 116, the pin-receiving holes 108 and 122 may be aligned, allowing for a pinned connection between the platform base 110 and the support legs 98. In order to maintain the effective parallel linkage discussed above, the offset between the pin-receiving holes 122 and 124 may be the same as an offset between the pin-receiving holes 70 and 72 of the hitch assembly 40.

In certain embodiments, the platform base 110 may include integral mounting pins 126, which may facilitate a rotational connection with a platform. In certain embodiments, the platform base 110 may also include base supports 128, which may contact the ground in the platform-loading position and may, accordingly, bear some (or all) of the weight of the lift 30 when the lift platform is being loaded. The base supports 128 may extend below the pin supports 116, as well as the elbows 84c and 98c, in the platform-loading position.

Other considerations may also inform the configuration of the base supports 128. For example, it has been recognized that instability of a parallel linkage may increase as one set of mounting points (e.g., the pin-receiving holes 122 and 124) pass through a plane defined by the other set of mounting points (e.g., the pin-receiving holes 70 and 72). In this light, referring again to FIG. 1, as the pin-receiving holes 122 and 124 approach line L1 (as defined by the pin-receiving holes 70 and 72), lift instability may increase. Accordingly, it may be appropriate to configure the base supports 128 to be sufficiently long so as to assume the weight of lift 30 (at least in part) before the pin-receiving holes 122 and 124 approach too closely to the line L1.

As can be seen in FIGS. 1-3, for example, the support assembly 42 (e.g., via the support legs 84 and 98) may connect to the platform base 110 (or another portion of the platform assembly 44) at a point that is substantially rearward of the front edge of the relevant platform. This may represent another distinct advantage of the disclosed lift. It will be recognized, for example, that through the use of the angled support legs 84 and 98, and this rearward connection between the support assembly 42 and the platform base 110, both the anchor point for lifting (i.e., the anchor 58 configured to include multiple rollers) as well as the front edge of the platform assembly 40 may be located relatively closely (from a horizontal perspective) to hitch the assembly roller 74. This may further facilitate the stable lifting of significant loads, including to points above the actual lifting mechanism.

Referring also to FIG. 10, a load-bearing platform 130 may be mounted to the platform base 110. For example, pin receivers 136 near a front edge 134 of the platform 130 may receive the mounting pins 126 of the platform base 110 in order to rotatably connect the platform 130 to the platform base 110. (In certain embodiments, additional connections or supports (e.g., hinged support bars connecting near the back edge of the platform 130) may also be provided (not shown).) In order to facilitate raising the platform 130 to the vehicle-loading position of FIG. 3, it will be understood that a tailgate of the cargo bed 52 may need to be removed. Beneficially, in such a case, the rotatable connection between the pins 126 and the pin receivers 136 may allow for the platform 130 to be rotated into place as a replacement tailgate for cargo bed 52, thereby allowing for appropriate containment of material in the cargo bed 52 with the lift 30 still in place (and without replacing the removed tailgate). Further, the illustrated orientation of the mounting pins 126 can allow the platform 130 to be removably engaged with the platform base 110, such that the platform 130 can be removed when not in use.

The platform 130 may include a load-bearing surface 132, which may, for example, be constructed from diamond-plate or other material, or appropriate coated, in order to resist load slippage. In certain embodiments, side rails 138 may be provided, with the rails 138 including pin-receiving holes 140 for mounting other components or assemblies. In certain embodiments, other structure may also be provided, such as reinforcing ribs along the underside of the surface 132 (not shown).

Referring also to FIG. 11, a ramp 142 may include atop surface 144 and a sloped surface 146 (or, in certain embodiments, only the sloped surface 146). Sides 148 may include pin members 150, which may themselves include pin-receiving holes 152 (or, for example, integral pins (not shown)). The pin-receiving holes 152 may be aligned with the pin-receiving holes 140 on the platform 130 in order to rotatably mount the ramp 142 to the platform 130. Accordingly, when the platform 130 is in the platform-loading position (e.g., a position similar to that illustrated in FIG. 1), the ramp 142 may assist in transferring heavy loads from the ground onto the platform 130. As with the platform 130, various other structures may also be provided, such as reinforcing ribs along the underside of ramp 142 (not shown).

Figure 12:
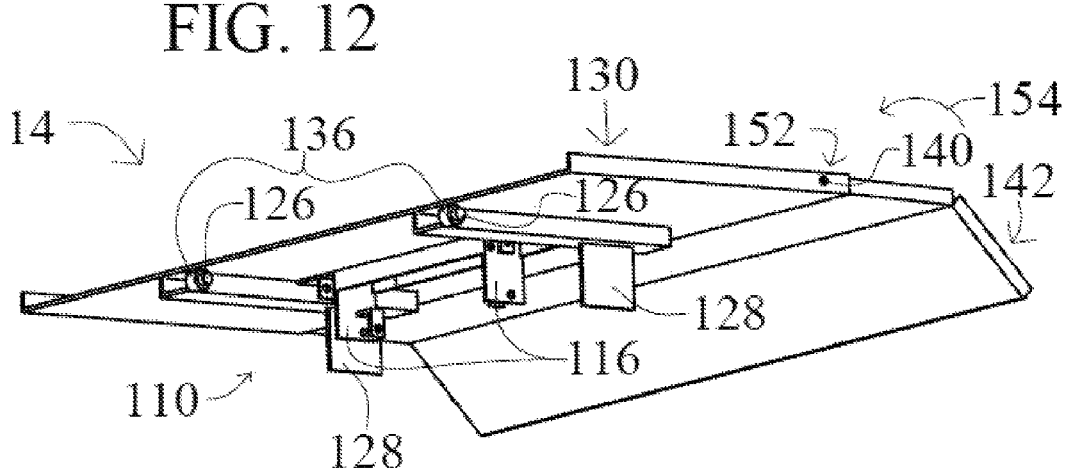
FIG. 12 is a lower perspective view of the load-bearing platform of FIG. 10 and the loading ramp of FIG. 11 mounted to the platform base of FIGS. 8 and 9.

Referring also to FIG. 12, a lower perspective view of the platform assembly 44 is presented, with the sides 148 of the ramp 142 removed for clarity. As can be seen in FIG. 12, the mounting pins 126 may be inserted into the pin receivers 136 in order to rotatably and removably mount the platform 130 to the platform base 110.

Figure 13:
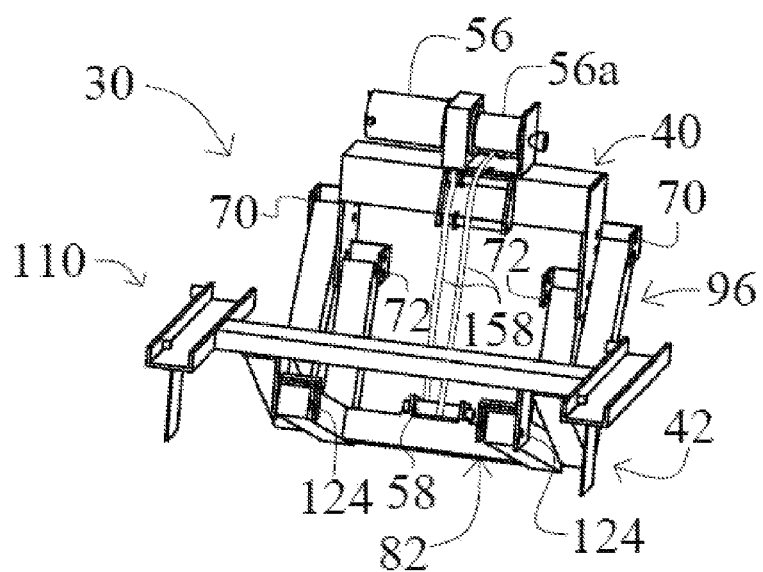
FIG. 13 is a rear perspective view of the lift of FIG. 1 with the load-bearing platform removed.

Referring also to FIG. 13, a rear perspective view of the lift 30 is presented, with the platform 130 removed for clarity. In order to install the lift 30 on, for example, a pick-up truck, a user may remove the tailgate of the truck cargo bed, insert the hitch receiver tube 64 into the truck hitch receiver (e.g., a standard 2-inch receiver), secure the tube 64 with a hitch pin, connect the lifting mechanism (e.g., the winch 56 coupled to a spool 56a) to a power source (e.g., a standard 12 V terminal from the truck), pin the platform 130 to the platform base 110, and use the lifting mechanism to orient the platform 130 appropriately (e.g., lower the platform 130 to the lowered, platform-loading position in order to load the platform 130 with a load to be lifted into the truck bed). In certain embodiments, a wireless remote control may be provided for control of the lifting mechanism. Once a loading (or unloading) operation has been completed, a user may remove the lift 30 and replace the tailgate of the cargo bed. Alternatively, a user may leave the lift 30 secured in the vehicle hitch receiver desired, rotating the platform 130 around the rotatable connection to the platform base 110 (e.g., a connection via the mounting pins 126 and the pin receivers 136, as depicted in FIG. 12) to serve as a replacement tailgate for the vehicle.

It will be understood, based on the discussion herein, that the lift 30 may exhibit various important dimensional relationships. For example, as also noted above, the offsets between mounting points for the support arms may be carefully designed in order to create the effective parallel linkage. As another example, referring again to FIG. 1, the length of the upper sections 84a and 98a of the support members 84 and 98 may be selected to be short enough, and the size of the angles 86 and 100 to be large enough, so that the lift does not contact the spare tire 54 or other obstacles near the hitch receiver 48 when in (or near) the platform-loading position and so that the elbows 84c and 98c do not scrape excessively on the ground. Likewise, the lengths of the upper sections 84a and 98a and the lower sections 84b and 98b, and the size of the angle 86 and 100 may be selected to be large enough, and the extension of the platform 130 forward of the pin supports 116 small enough, to allow the platform assembly 44 to clear the hitch assembly 40 as the lift is raised or lowered. Further, the length of the lower sections 84b and 98b and the elbows 84c and 98c may be selected so as to prevent undesired contact between the platform assembly 44 and the upper sections 84a and 98a. A balance may also be chosen between placing the anchor 58 further rearward on one of the support members (e.g., the inner support member 82), in order to increase lifting efficiency at lowered orientations (e.g., orientations at or near the platform-loading orientation), and ensuring that the platform assembly 44 does not interfere with the cable/strap 158 between the anchor 58 and the winch 56 (or with another lifting mechanism).

Figure 14:
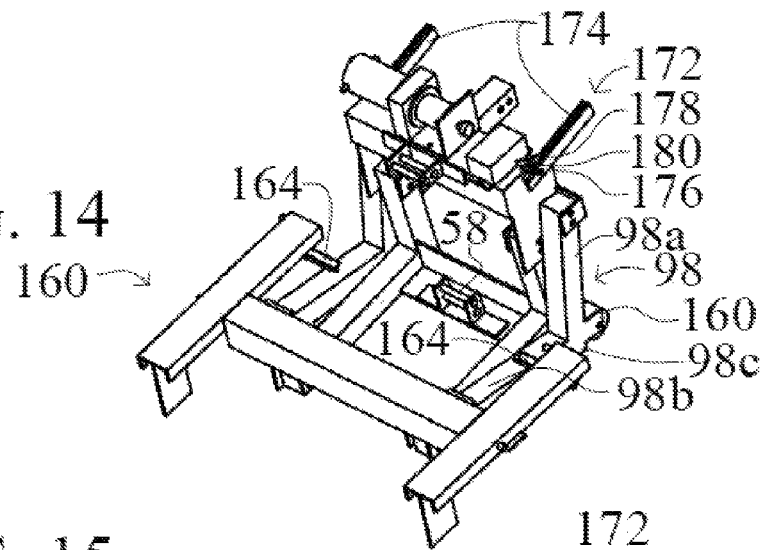
FIGS. 14 and 15 are perspective views of another example lift, with a load-bearing platform removed.
Figure 15:
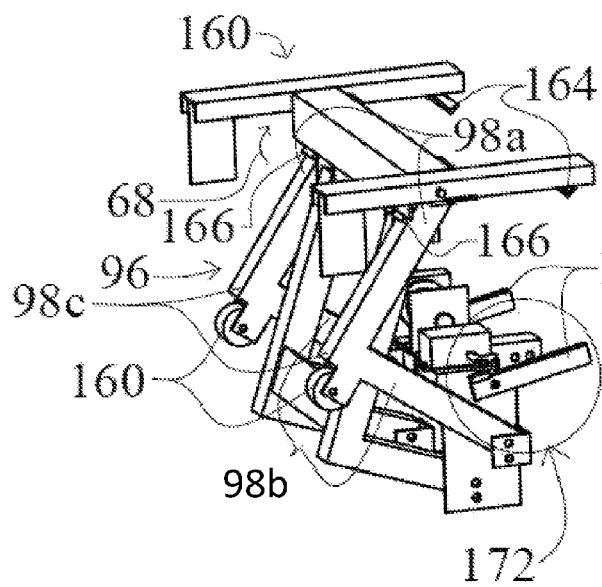
Figure 15A:
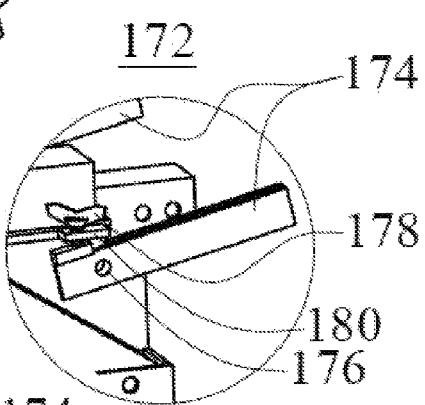
FIG. 15A is an enlarged view of stabilizing mechanisms included in the example lift of FIGS. 14 and 15.

In certain embodiments, various additional components or assemblies may be included in order to increase the stability of the lift 30. For example, referring also to FIGS. 14 and 15, hitch assembly stabilizers 172 may be included on the hitch assembly 40. For example, as also depicted in the enlarged view of FIG. 15A, the hitch assembly stabilizers 172 may include rigid members 174, which may extend from pinned connections 176 toward the vehicle 46. Through a locking mechanism, the rigid members 174 may be placed in contact with a rigid portion of the vehicle 46 (e.g., the bumper 50, tube stock extending laterally from the hitch receiver 48 (not shown), and so on) and secured against rotation around pinned connections 176. As such, a rigid connection (in addition to the connection between the hitch receiver 48 and the hitch receiver tube 64) may be formed between the hitch assembly 40 and the vehicle 46, thereby assisting in the stabilization of the lift 30. For example, thumb screws 178 may be threaded through threaded tabs 180 in order to lock the rigid member 174 into contact with the vehicle 46 and against rotation about the pinned connection 176. This may stabilize the hitch assembly 40 by resisting undesirable lateral rotation (or wobbling) of the hitch assembly 40 with respect to the vehicle 46, thereby lending further stability to the platform 130 (not shown in FIGS. 14 and 15) and any load resting on it.

Figure 16:
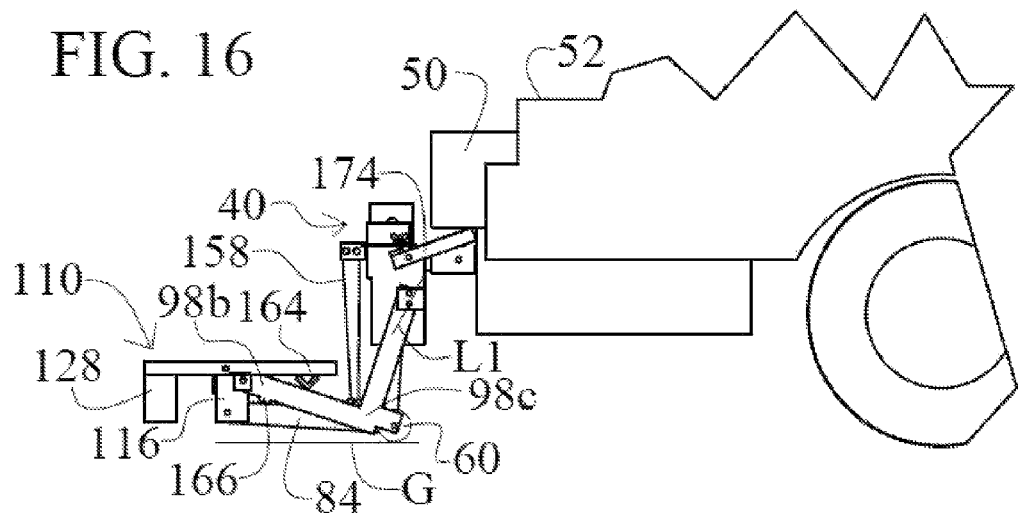
FIGS. 16 and 17 are side views of the example lift of FIGS. 14 and 15.

Other stability mechanisms may also be utilized. For example, forward stabilizers 164 and rear stabilizers 166 may be provided. The forward stabilizers 164, for example, may be rigid bodies mounted to the underside of a forward portion of the platform base 110. Referring also to FIG. 16, as the lift 30 approaches the lower platform-loading position, the stabilizers 164 may come into contact with portions of the support assembly 42 (e.g., the outer support legs 98). This contact may not only resist lateral wobble of the platform 130 (via the platform base 110) but may also act to urge the forward edge 134 of the platform 130 somewhat upwards. Depending in part on the height of the stabilizers 164 (and the corresponding contact point on the support assembly 42), this may result in the platform 130 tilting slightly upward (back-to-front) as the lift 30 approaches the platform-loading position, thereby facilitating easier loading of the platform 130, while introducing a gravitationally-driven bias away from the vehicle 46 for any load on the platform 130.

Figure 17:
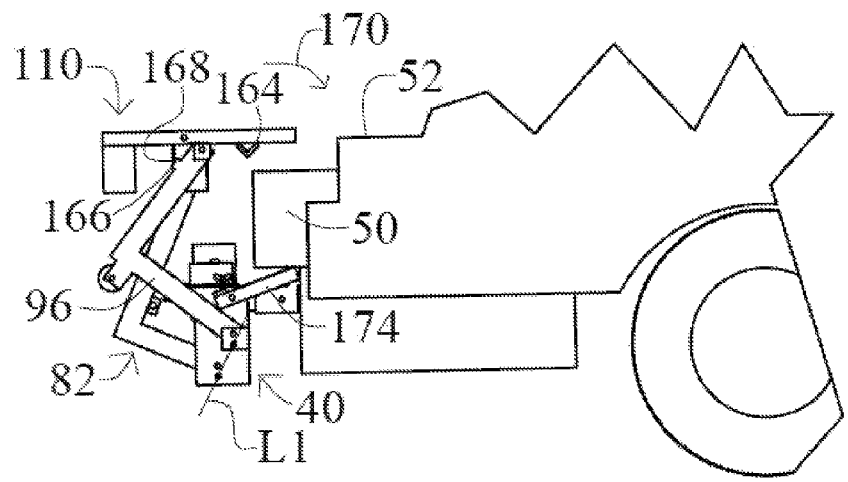

Similarly, the rear stabilizers 166 may be rigid bodies mounted to the underside (in a platform-loading position) of a portion of the support assembly 42 (e.g., the outer support legs 98). Referring also to FIG. 17, as the lift 30 approaches the higher vehicle-loading position, the stabilizers 166 may come into contact with a portion of the platform assembly 44 (e.g., an underside extension 168 of the platform base 110). This contact may not only resist lateral wobble of the platform 130 (via the platform base 110) but may also act to urge the forward edge 134 of the platform 130 somewhat downwards. Depending in part of the height of stabilizers 166 (and the corresponding contact point on platform assembly 44), this may result in the platform 130 tilting slightly downwards (back-to-front) as the lift 30 approaches the vehicle-loading position, thereby facilitating easier unloading of the platform 130 into the vehicle 46, while introducing a gravitationally-driven bias toward the vehicle 46 for any load on the platform 130.

It will be understood that various alternative configurations may be possible. For example, both the rear stabilizers 166 and the forward stabilizers 164 may generally operate on the principle of introducing a rigid contact point between the support assembly 42 and the platform assembly 44 as the lift 30 approaches, respectively, a raised vehicle-loading orientation and a lowered platform-loading orientation. As such, for example, it will be understood that the forward stabilizers 164 might alternatively be configured as rigid bodies mounted to portions of the support assembly 42, with the stabilizers contacting a rigid portion of the platform assembly 44 as the lift 30 approaches the platform-loading position. Likewise, it will be understood that the rear stabilizers 166 might alternatively be configured as rigid bodies mounted to the platform assembly 44, with the stabilizers contacting a rigid portion of the support assembly 42 as the lift 30 approaches the vehicle-loading position. In such cases, the general operation of the stabilizers 166 and 164 may be similar to that described above, although the location of various components may have been rearranged.

It will also be understood that the heights or locations of the various stabilizers 164 and 166, as well as the configuration and orientation of the respective contact points for the stabilizers, may be adjusted in order to vary when and to what extent the stabilizers are engaged during operation of the lift 30. For example, the stabilizers 164 of greater heights might be provided in order to provide stabilization earlier in the progression toward the platform-loading position or to cause a larger tilting of the platform 130 once the stabilizers 164 are engaged. Similar considerations may also apply with respect to the stabilizers 166 and the progression toward the vehicle-loading position. In certain embodiments, the height of the stabilizers 164 and 166 (or corresponding configuration of the contact points for these stabilizers) may be selected so that the stabilizers 164 and 166 are engaged appropriately early in the approach of the pin-receiving holes 122 and 124 to the line L1.

Still referring to FIGS. 14-17, in certain embodiments support rollers 160 may be provided on one or both of the support legs 84 and 98 (or another location). In certain embodiments, the rollers 160 may facilitate easy transport of the lift 30 between locations. For example, the rollers 160 may support the weight of the lift 30 allowing the lift to be rolled from a storage location to a location of the vehicle 46, for mounting of the lift 30 on the vehicle 46. In certain embodiments a handle (not shown) may be provided that provides a convenient grip for a user as the user pulls (or pushes) the lift 30 on the rollers 160.

In certain embodiments, the rollers 160 may also further facilitate the use of the lift 30 with a variety of vehicles with different mounting configurations (e.g., vehicles with different cargo bed heights or hitch mount heights), without necessarily requiring other adjustments to the lift 30 (or the relevant vehicles). For example, the rollers 160 may be used to roll the lift 30 from a storage location to a mounting location (i.e., a location at the rear of the vehicle 46). With the lift 30 still supported by the rollers 160, the hitch receiver tube 64 may be inserted into the hitch receiver 48. When the tube 64 is secured in the receiver 48, the weight of the lift 30 in combination with the rolling support of the rollers 160 may impart an upward force on the vehicle 46. This may lift the vehicle 46 somewhat, thereby allowing the lift 30 to be used even with vehicles having lower hitch receiver heights. (It will be understood that the above-noted lifting may not necessarily raise the vehicle 46 off the ground. Rather, in certain instances, a portion of the weight of vehicle 46 may be removed from the suspension of the vehicle 46, thereby allowing the body of the vehicle 46 to move upwards, without the wheels of the vehicle 46 necessarily leaving the ground.)

Figure 18:
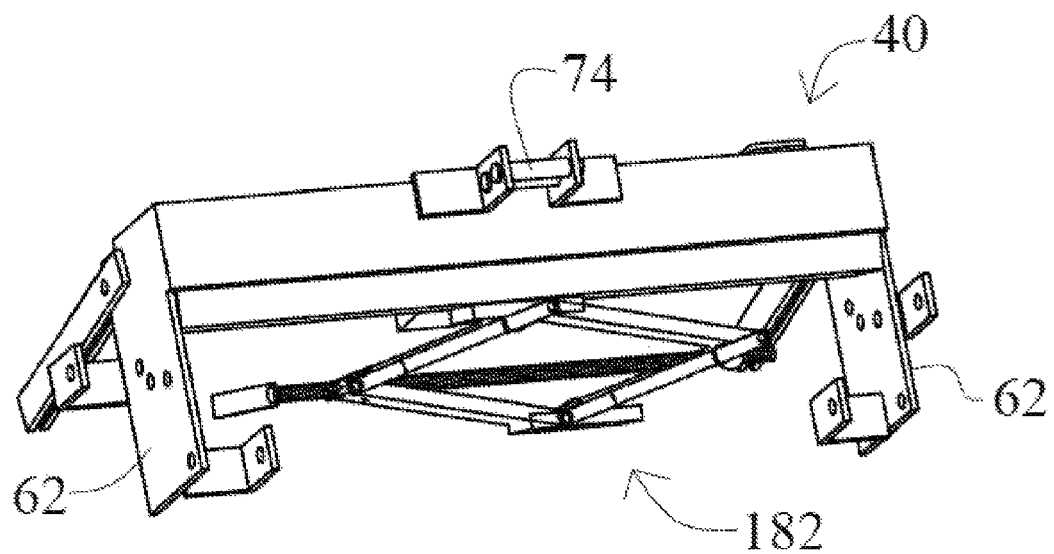
FIGS. 18 and 19 are perspective views of a hitch assembly including a jack.
Figure 19:
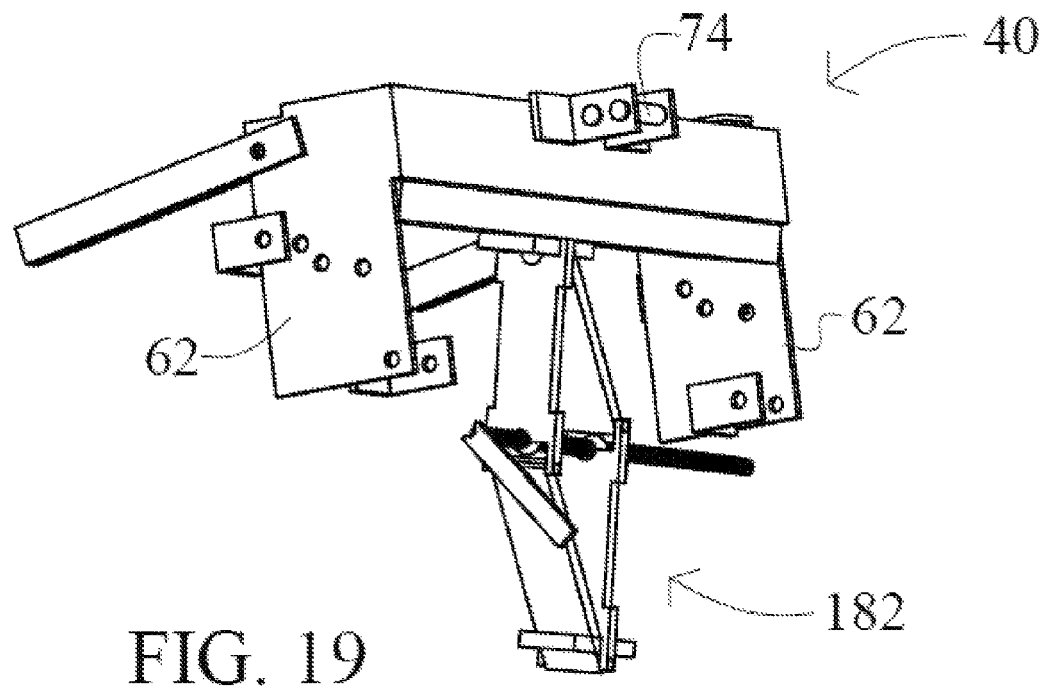
Figure 20:
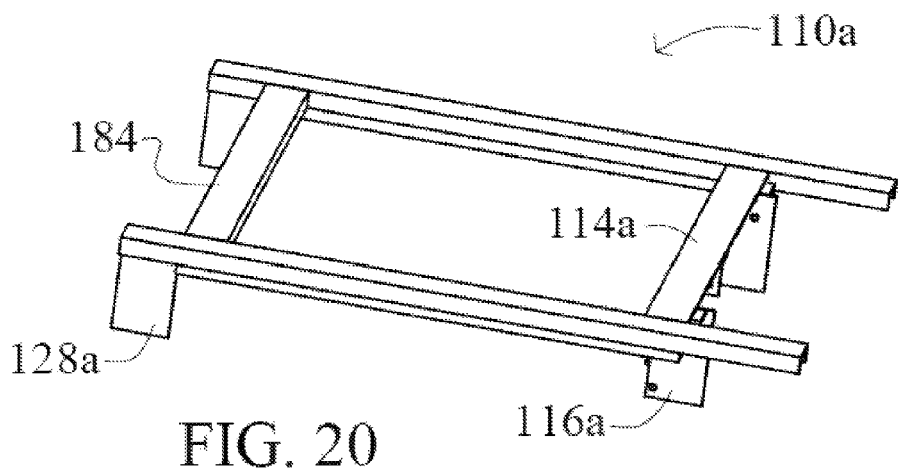
FIG. 20 is a perspective view of an extended platform base included in a platform assembly of another example lift.

Referring also to FIGS. 18 and 19, a jack (e.g., a scissors jack 182) may be provided as an additional support for the hitch assembly 40. In certain embodiments, the potentially high lifting capacity of the lift 30 may allow users to lift very heavy loads into vehicles. These heavy loads, however, may cause undesirable movement of the vehicles. For example, because the lift 30 may be attached to a rear hitch receiver of a vehicle (e.g., the receiver 48 of the vehicle 46), use of the lift 30 with a particularly heavy load may cause the rear of the vehicle to sag excessively. As such, it may be useful to provide an additional support for the lift 30 that is somewhat independent of the associated vehicle. As also noted above, such a support may be in the form a jack, such as the scissors jack 182 attached to hitch assembly 40.

In certain embodiments, platforms of various sizes may be utilized with the lift 30. This may, for example, facilitate lifting of larger loads, such as motorcycles, ATVs, snowmobiles, and so on. Further, in certain embodiments a platform of the lift 30 may be utilized to effectively extend the cargo bed of a relevant vehicle. For example, referring also to FIGS. 20-23, an extended platform base 110a is depicted, having base supports 128a to support the platform base 110a against the ground, and pin supports 116a on a cross support 114a for rotatably mounting a portion of the support assembly 42 (e.g., the support legs 84 and 98) to the platform base 110a. It will be noted that, in certain embodiments, the base supports 128a may be located near the rear edge of the platform base 110a in order to more fully support an extended platform assembly 44a. Likewise, it will be noted that the pin supports 116a may still be located rearward of a front edge 134a of the extended platform 130a, although not necessarily near the center of the platform 130a.

Figure 21:
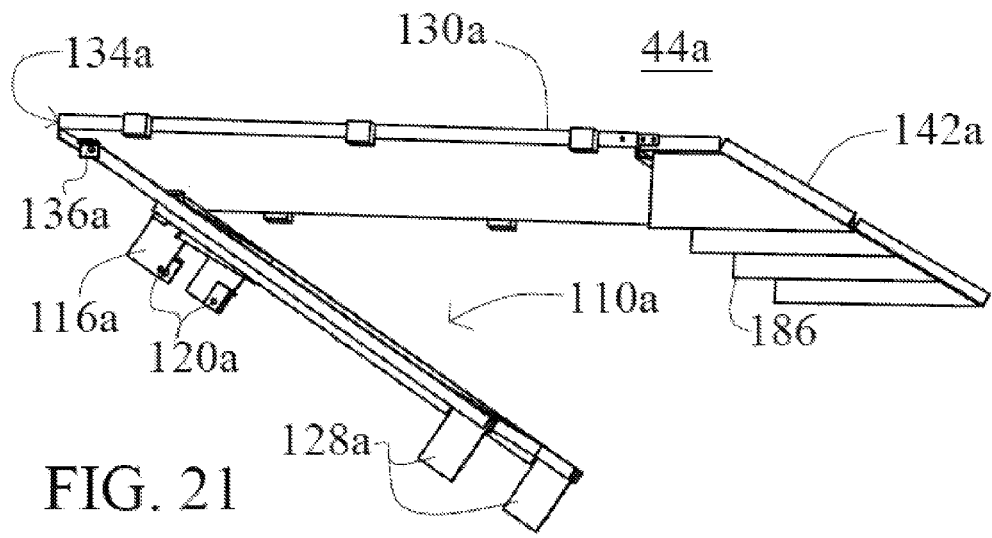
FIG. 21 is a perspective view of an extended load-bearing platform mounted to the platform base of FIG. 20.
Figure 22:
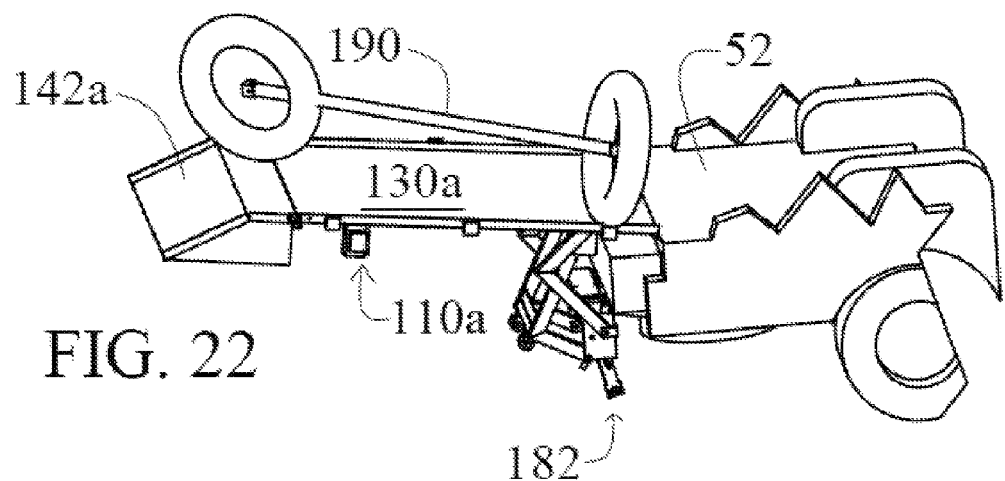
FIGS. 22 and 23 are perspective views of an example lift in operation, with the extended load-bearing platform of FIG. 21.
Figure 23:
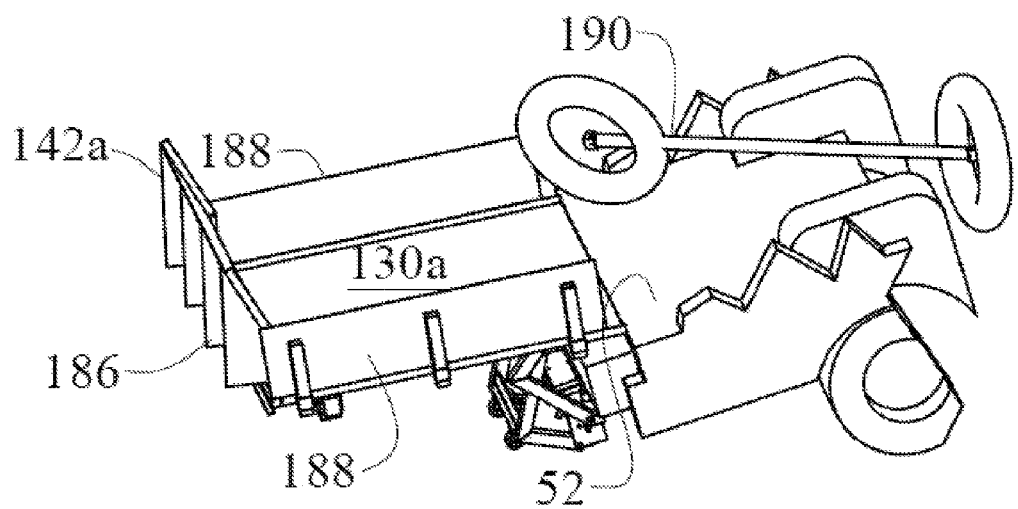

Referring specifically to FIGS. 22 and 23, the extended platform 130a (or another platform) may serve as an extension of the cargo bed 52, which may be useful, for example, if a load (e.g., a motorcycle 190) does not fully fit on the bed 52. In certain embodiments, a hinged ramp 142a (also depicted in FIG. 21) may also be provided for easier loading and unloading of the platform 130a. In certain embodiments (and as depicted in FIGS. 21-23), the ramp 142a may be provided with ribs 186 for strength. Likewise, ribs or other strengthening members may be provided for the platform 130a or the platform base 110a. In certain embodiments, the ramp 142a may be rotatably mounted to the platform 130a and may accordingly be rotated upwards (as in FIG. 23) to serve as a tailgate for the extension of the cargo bed 52 provided by the extended platform 130a. In certain embodiments, raised sides 188 may be provided to the platform 130a (or the platform base 110a) in order to further contain the extended cargo bed (as also depicted in FIG. 23).

Figures 24, 25:
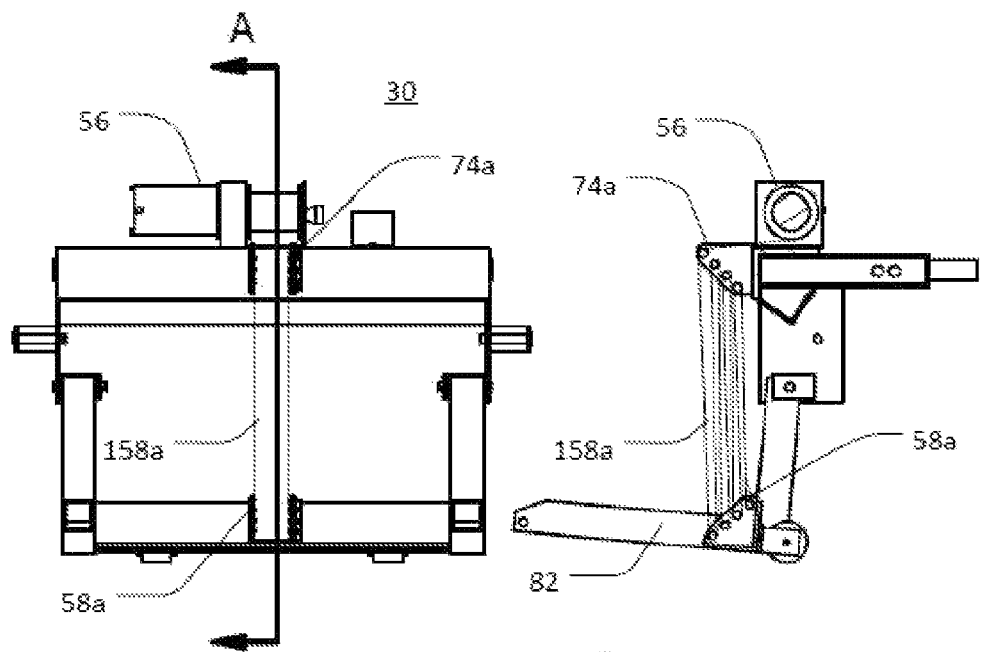
FIG. 24 is a rear view of an example lift including an angled pulley configuration.
FIG. 25 is a cross-sectional side view of the example lift of FIG. 24.
Figures 26, 27:
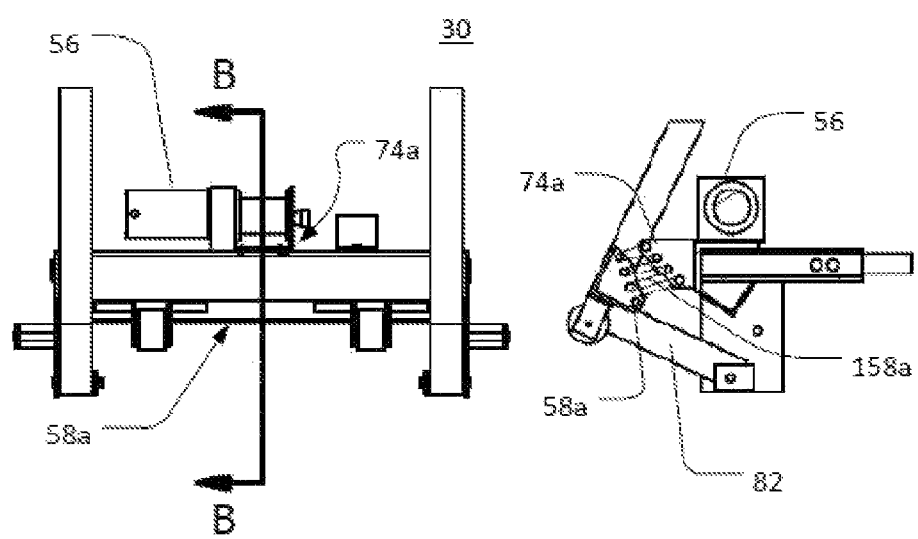
FIG. 26 is another rear view of the example lift of FIG. 24.
FIG. 27 is another cross-sectional side view of the example lift of FIG. 24.

Referring also to FIGS. 24-27, aspects of certain embodiments of the connection between the lifting power source (e.g., the winch 56), the rollers 74 and the anchor 58 are depicted. FIGS. 24 and 26 depict, respectively, an embodiment of the lift 30 in a lowered and a raised orientation. FIG. 25 depicts a side view of the lift 30 as configured in FIG. 24, taken through section A-A of FIG. 24. FIG. 27 depicts a side view of the lift 30 as configured in FIG. 26, taken through section B-B of FIG. 26. For clarity of presentation, the platform 130 and the platform base 110 are not depicted in FIGS. 24-27.

As can be seen in FIGS. 24-27 (and as also discussed above), various pulley configurations may be utilized in order to transmit lifting force from the lifting mechanism (e.g., the winch 56) to the platform 130 (e.g., via the anchor 58 on the inner leg assembly 82). For example, four rollers 74a (which may or may not actually rotate) may be provided near the winch 56 and four rollers 58a may be provided on the inner leg assembly 82. A strap 158a may extend from the winch 56 and wind between the various rollers 74a and 58a, in order to multiply the lifting force of the winch 56, as applied to the leg assembly 82 (and the platform 130 (not shown)).

In certain embodiments, it may be useful to orient the rollers 74a and the rollers 54a at an angle with respect to horizontal. (In this regard, an angle may be referred to as sloping or angling "upward" (or "up," and so on) if it rises from back to front (with respect to the vehicle 46). Likewise, an angle may be referred to as sloping or angling "downward" (or "down," and so on) if it falls from back to front (with respect to the vehicle 46).) As depicted in FIG. 25, for example, when the platform assembly 44 is near the platform-loading (lowered) position, the rollers 74a may be oriented along a line angling down (from front to back) at approximately 45° and the rollers 58a may be oriented along a line angling up (from front to back) at approximately 45°. As can be seen in FIG. 25, such an angled (or otherwise offset) orientation of the rollers 74a, in combination with such an angled (or otherwise offset) orientation of the rollers 58a may provide appropriate clearance between the strap 158a and various other components of the lift 30 (including other portions of the strap 158a) when the lift 30 is at a lowered orientation, while also allowing easy visual inspection of the strap 158a (e.g., to investigate wear or verify appropriate alignment). Further, as can be seen in FIG. 27, as the support legs 82 are raised the complementary angled orientations of the rollers 74a and 58a may ensure that appropriate clearance is maintained throughout the lifting operation. Indeed, due in part to the angled orientation of the rollers 74a and 58a, it can be seen that even when the lift 30 is raised to the vehicle-loading position, there is appropriate clearance between the various portions of the strap 158a as well as between the strap 158a and various other components of the lift 30.

It will be understood that the various rollers (e.g., the rollers 74a or 58a) need not necessarily be oriented along a straight line for the considerations discussed herein to apply. For example, similarly useful clearance may be maintained with various of the rollers 74a oriented at an angled offset from others of the rollers 74a (with respect to horizontal), without the rollers 74a collectively defining a single straight line. Likewise, appropriate clearance may also be maintained with various of the rollers 58a oriented at an angled offset from others of the rollers 58a (with respect to horizontal), without the rollers collectively defining a single straight line.

As also noted above, in various embodiments the anchor 58 (and, for example, rollers 58a) may not necessarily be located on the inner leg assembly 82. As such, it will be understood that the discussion above regarding the rollers 74a and 58a may be equally applicable to embodiments of the lift 30 in which the anchor 58 (and the rollers 58a) are not located on the inner leg assembly 82. Further, it will be understood that the discussion above may also apply with respect to various roller configurations than those explicitly depicted in the Figures, configurations using a cable or other connector rather than the strap 158a, and so on.

In some embodiments, it may be useful to provide a lift that can raise and lower a cart, such that a load can be transported to or from the lift using the cart and can be raised (or lowered) by the lift without being removed from the cart. Correspondingly, in some embodiments, it may be useful to provide a cart for use with a lift that can carry a load to the lift, and then be removably engaged with the lift to be lifted along with the load.

Figure 28:
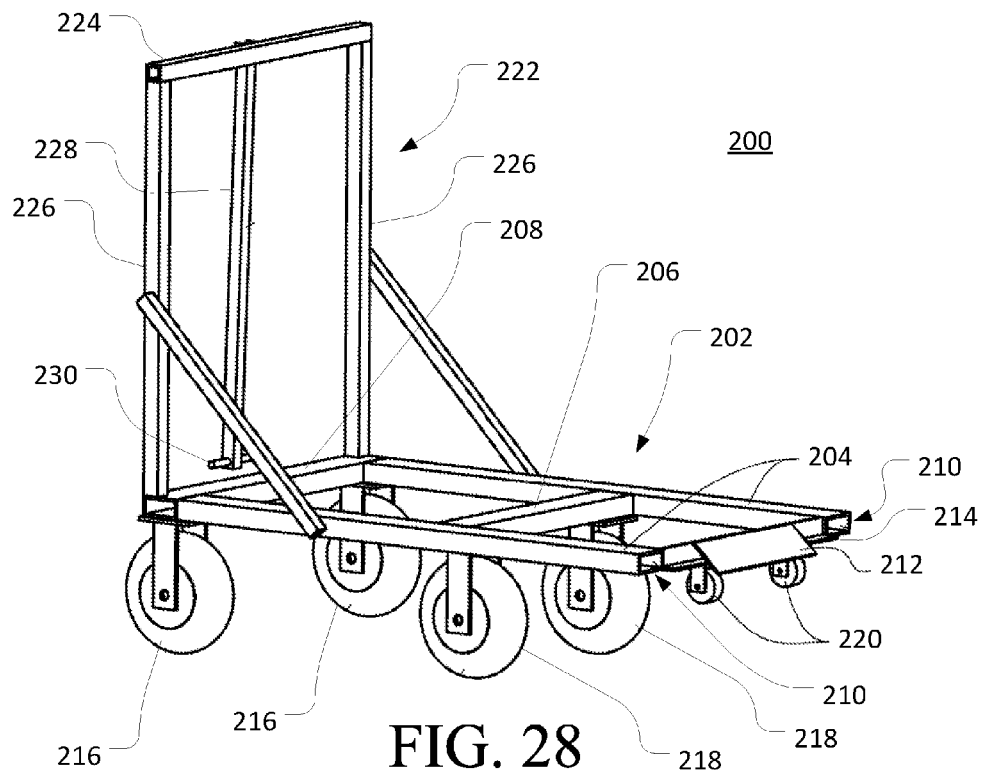
FIG. 28 is a perspective view of an example cart for use with a lift system.

As illustrated in FIG. 28, an example cart 200 can be configured for use with the lift 30 illustrated in FIGS. 1 through 3, or with other lifts according to this disclosure. In the embodiment illustrated, the cart 200 includes a support structure configured as a support frame 202 formed from square tubing. The support frame 202 includes a pair of axially disposed tubes 204, which are joined to each other by cross tubes 206 and 208. Collectively, the tops of the tubes 204, 206, and 208 can provide a support surface for supporting a load, such as a generator, pallet, or other object.

In some embodiments, the cart 200 can include attachment structures to facilitate removable engagement of the cart 200 with a lift. In the embodiment illustrated, the front ends of the tubes 204 exhibit respective openings 210. As also discussed below, the openings 210 can be engaged by corresponding attachment structures on a lift to removably engaging the cart 200 with the lift. In other embodiments, other attachment structures are alternatively (or additionally) possible. For example, the cart 200 can be provided with brackets (not shown) that extend away from the tubes 204 to engage corresponding openings (or other attachment structures) on a cart.

In the embodiment illustrated, the tubes 204, 206, and 208, as well as other members of the support frame 202 are joined together by welding. In other embodiments, parts of the support frame 202 can be joined in other ways, including using fasteners, brackets, and so on. Similarly, in the embodiment illustrated, the tops of the tubes 204, 206 and 208 directly provide a support surface for supporting the load. In other embodiments, other structures can alternatively (or additionally) provide the support surface for supporting the load, such that the load can be supported indirectly by the tubes 204, 206, and 208 (or other parts of the support frame 202).

In some embodiments, one or more rigid members can extend forward of the support frame 202 and the corresponding support surface. For example, the cart 200 includes a ramp 212 that extends forwards of, and angles downwardly relative to, the upper surfaces of the tubes 204. The ramp 212 can be secured to the support frame 202 in various ways, including, as illustrated, via welding to a reinforcing L-bracket 214, which can itself be welded to the tubes 204. As also discussed below, the ramp 212 (or other similar rigid members) can help to move a load onto or off of the support frame 202.

The cart 200 can be provided with a number of wheels, to allow for relatively easy movement of relatively heavy loads. In the embodiment illustrated, the cart 200 includes a rearward set of relatively large casters 216, a forward set of relatively large wheels 218, and a forward set of relatively small support wheels 220. As also discussed below, the casters 216 and the wheels 218 can serve as the primary rolling supports for transporting a load with the cart 200, and the support wheels 220 can provide support for the cart 200 when the cart 200 is tilted forward for moving a load onto (or off of) the cart from (or to) the ground. In other embodiments, other configurations of wheels for the cart 200 are also possible, including configurations with differently arranged casters or wheels, different numbers of casters or wheels, and so on.

To facilitate relatively easy movement, the cart 200 also includes a handle structure 222 that extends upwardly from the support frame 202. In order to move the cart 200, a user can push or pull on an upper cross tube 224 or either support tubes 226 of the handle structure 222 in order to guide the cart 200 as desired. In the embodiment illustrated, a loading lever 228 is rotatably secured to the cross tube 224. The loading lever 228 includes an attachment structure 230 for a cable or other flexible element at a lower end of the loading lever 224. In the embodiment illustrated, the attachment structure 230 is configured as a pair of rigid cylinders extending to either lateral side of the loading lever 228. In other embodiments, other configurations are possible. As also discussed below, the loading lever 228 and the attachment structure 230 can be useful in moving relatively heavy loads onto the support frame 202.

Figure 29:
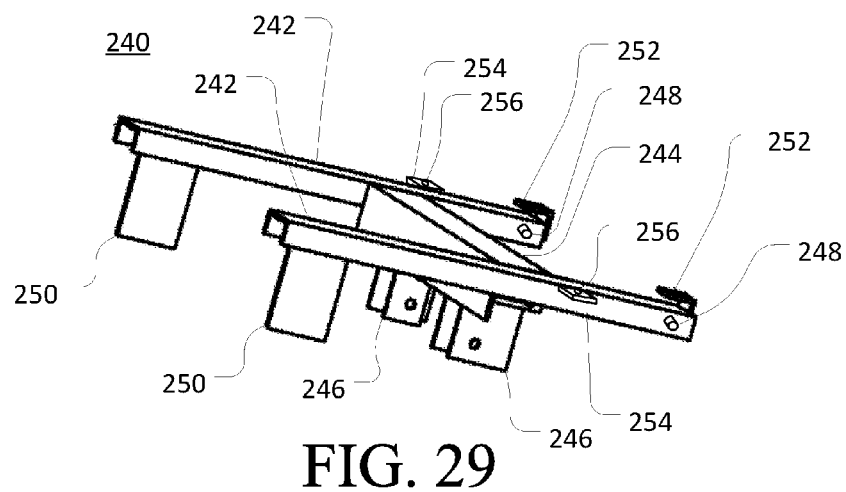
FIG. 29 is a perspective view of a platform base for a lift for use with the cart of FIG. 28.

In some embodiments, the cart 200 can be used with a lift that includes a platform assembly with a platform base that includes attachment structures for removably engaging the cart 200. As illustrated in FIG. 29, a platform base 240 can be configured for use with the platform assembly 44 of the lift 30 (see, e.g., FIGS. 1 through 3) in place of the platform base 110 (see, e.g., FIGS. 8 and 9), to facilitate removable engagement of the cart 200 (or other carts) with the lift 30. Generally, the platform base 240 can be configured similarly to the platform base 110, with support members 242, a cross support 244, pin supports 246, pins 248 to removably and rotatably engage a platform (e.g., the platform 130, as illustrated in FIG. 10), base supports 250, and so on. Further, the platform base 240 can include an attachment structure for engaging the openings 210 (or other attachment structures) of the cart 200. In the embodiment illustrated, for example, the platform base 240 includes a right-angle bracket 252 extending upward and rearward from a front end of each of the support members 242.

In some embodiments, the platform base 240 can include other structures to engage the cart 200, or another cart. For example, in the embodiment illustrated in FIG. 29, the platform base 240 includes flat brackets 254 that extend laterally outward from each of the support members 242 and include respective holes 256. As also discussed below, the brackets 254 and holes 256 can be used to pin a cart to the platform base 240.

Like the platform base 110, the platform base 240 can allow for a platform (e.g., the 130 illustrated in FIG. 10) to be removably and rotatably secured to the lift 30. For example, when a user intends to use the lift 30 with the platform 130, the pin receivers 136 on the platform 130 can be slide onto the pins 248 of the platform base 240, such that the platform 130 is rotatably secured to the platform base 240. The platform 130 can then be used to lift a load onto or off of a vehicle, and can also be pivoted upward, with the lift 30 in the vehicle-loading position (see, e.g., FIG. 3), to serve as a rear gate for the vehicle. Further, when a user intends to use the lift 30 with a cart (e.g., the cart 200), the user can remove the pin receivers 136 from the pins 248, such that the upper surface of the support members 242 and the cross support 244 can provide a support surface for the cart.

Figure 30:
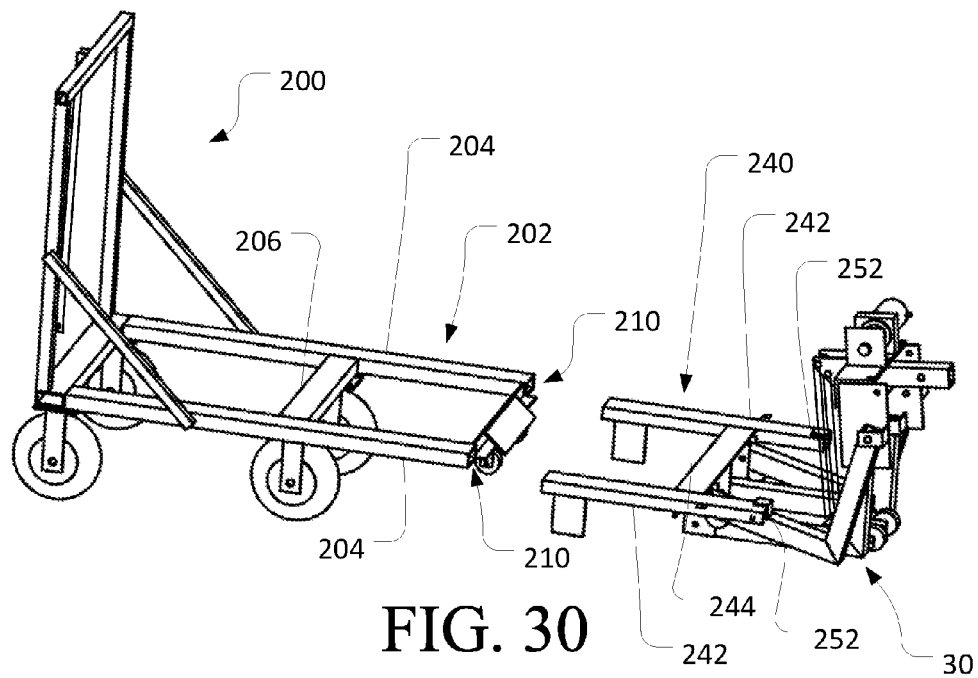
FIGS. 30 and 31 are perspective views of the cart of FIG. 28 in use with a lift that includes the platform base of FIG. 29.
Figure 31:
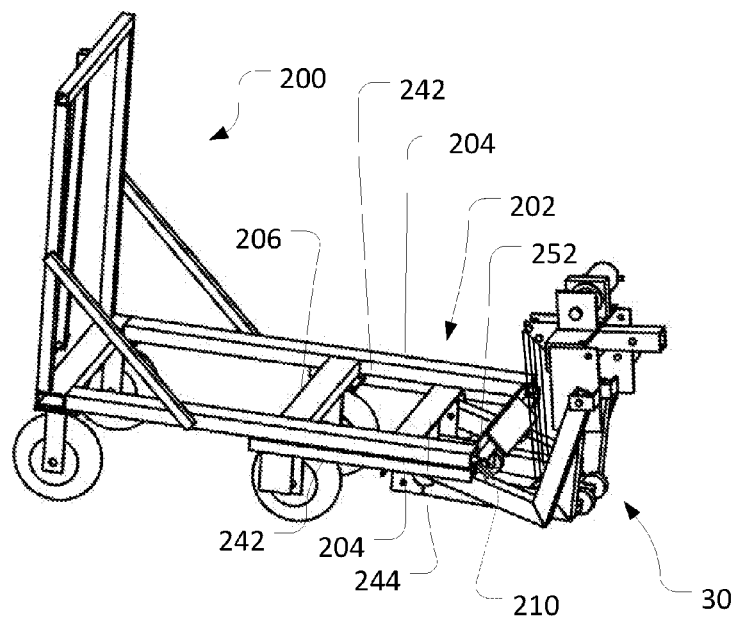

As illustrated in FIG. 30, in order to engage the cart 200 with the lift 30, the lift 30 can be equipped with the platform base 240 and the platform 130 can be removed from the platform base 240. The lift 30 can be moved into the platform-loading position, and the cart 200 can be aligned with the lift 30 (e.g., with the tubes 204 generally parallel to the support members 242). The cart 200 can then be rolled forward until the forward portion of the support frame 202 is disposed above the platform base 240, and the openings 210 on the axial tubes 204 are disposed somewhat behind the brackets 252 on the platform base 240. The lift 30 can then be used to raise the platform base 240 until the tops of the support members 242 and the cross support 244 (or another support surface of the platform base 240) contact the axial tubes 204 (or other structure) of the support frame 202. The cart 200 can then be moved farther forward, until the brackets 252 are appropriately seated within the openings 210 (or until other attachment structures of the platform base 240 and the cart 200 are appropriately engaged), as illustrated in FIG. 31. The lift 30 can then be used to raise the cart 200. As also discussed below, in some embodiments, the cart 200 can be further secured to the lift 30 (e.g., using the brackets 254 illustrated in FIG. 29) before the cart 200 is lifted.

In some implementations, the cart 200 can be engaged with the lift 30 without loading the cart 200. For example, the cart 200 can be engaged with the lift 30 and raised to a truck bed in order to transfer a load from the truck bed onto the cart 200. The cart 200 and the load can then be lowered, the cart disengaged from the lift 30 in a process operating in reverse of the engagement process illustrated in FIGS. 30 and 31 and described above, and the cart 200 used to transport the load as desired.

Figure 32:
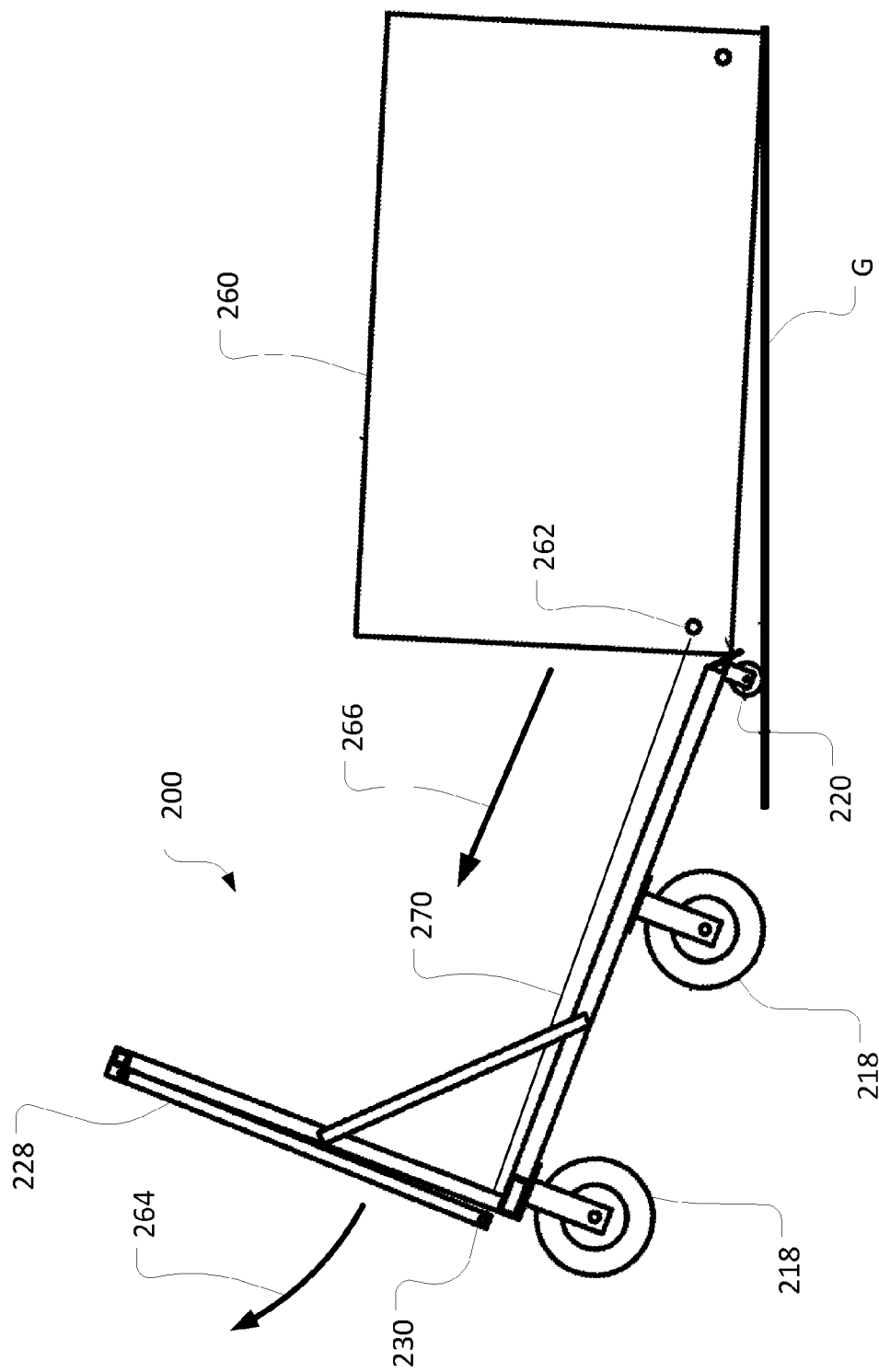
FIGS. 32 through 34 are side views of an operation to load the cart of FIG. 28 and use the lift of FIGS. 30 and 31 in use to lift the load onto a vehicle.

In some implementations, the cart 200 can be loaded before being engaged with the lift 30. As illustrated in FIG. 32, for example, the cart 200 can be aligned with a load such as a generator 260 and then tipped forward to rest on the front wheels 218 and the support wheels 220. A cable 270 or other flexible member (e.g., a strap) can be secured to the attachment structure 230 on the loading lever 228 and also to an attachment structure on the generator 260, such as a pin 262. The generator can be lifted slightly until a front edge of the generator rests on the ramp 212, then the loading lever 228 pivoted upwards (as indicated by arrow 264) to move the generator 260 fully onto the cart 200 (as indicated by arrow 266). The cart 200 can then be returned to a horizontal orientation, with both the wheels 218 and the casters 216 resting on the ground.

Figure 33:
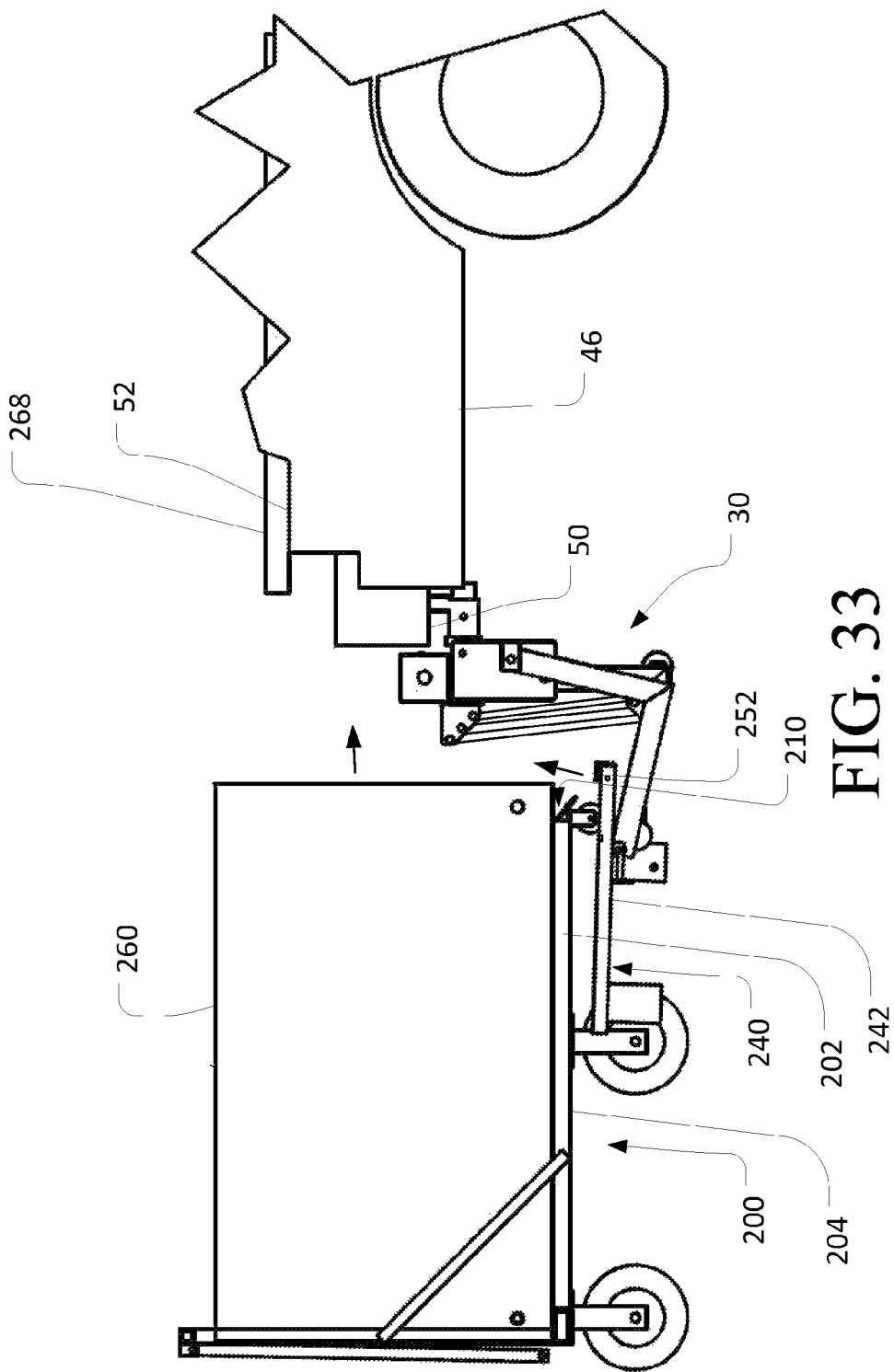
Figure 34:
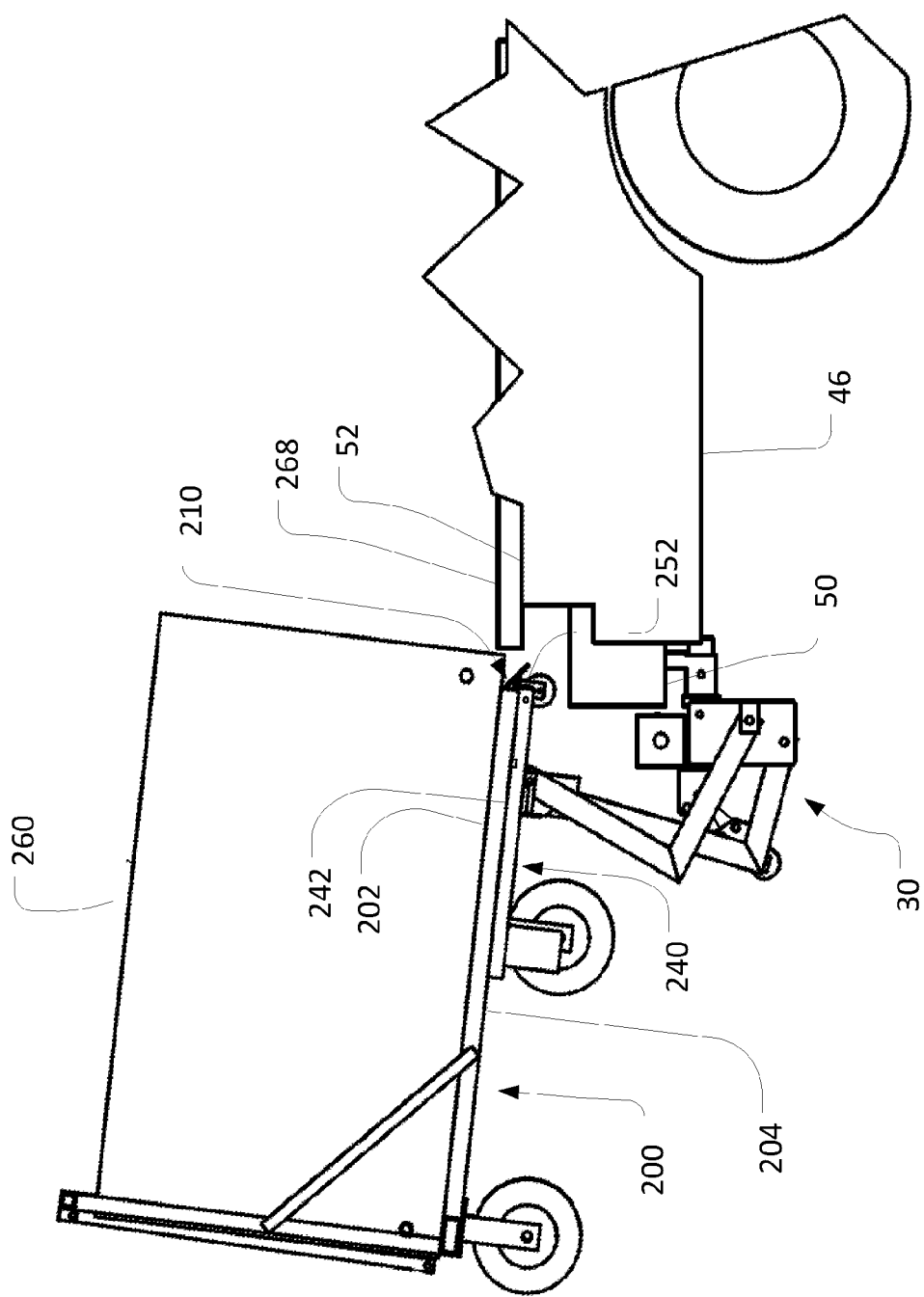

Once the generator 260 is loaded onto the cart 200, the cart 200 and the lift 30 can be used to lift the generator 260 onto the bed 52 of the vehicle 46 (or a support resting thereupon, such as a pallet 268) in a similar manner as described with regard to FIGS. 29 and 30 for the cart 200 alone. As illustrated in FIG. 33, for example, the lift 30 can be moved into the platform-loading position, and the cart 200 can be aligned with the lift 30 and then rolled forward until the forward portion of the support frame 202 is disposed above the platform base 240, with the openings 210 on the axial tubes 204 disposed somewhat behind the brackets 252 on the platform base 240. The lift 30 can then be used to raise the platform base 240 until the support surface of the platform base 240 (e.g., the tops of the support members 242) contacts the axial tubes 204 (or other structure) of the support frame 202. The cart 200 can then be moved farther forward, until the brackets 252 are appropriately seated within the openings 210 (or until other attachment structures of the platform base 240 and the cart 200 are appropriately engaged). As illustrated in FIG. 34, the lift 30 can then be used to raise the cart 200 and the generator 260 to the vehicle-loading position, such that the generator 260 can be moved onto the bed 52 or the pallet 268.

As illustrated in FIG. 34 in particular, as the lift 30 lifts the cart 200 over a course of travel between the platform-loading position (see FIG. 33) and the vehicle-loading position (see FIG. 33), the platform base 240 and the cart 210 can be tilted somewhat forward. This may be useful, for example, in order to ensure that the brackets 252 on the platform base 240 remain securely engaged with the openings 210 on the support frame 202. This may also be useful, for example, in order to bias the load of the generator 260 towards the vehicle 46, such that the vehicle 46 can help to stop movement of the generator 260 if the generator 260 begins to slip free of the cart 200. In some embodiments, the lift 30 can initially hold the cart 200 in a horizontal orientation (e.g., as illustrated in FIG. 33) and can move the cart 200 in a tilted orientation over only part (e.g., a majority) of the course of travel between the platform-loading position and the vehicle-loading position (e.g., as illustrated in FIG. 34).

Figure 35:
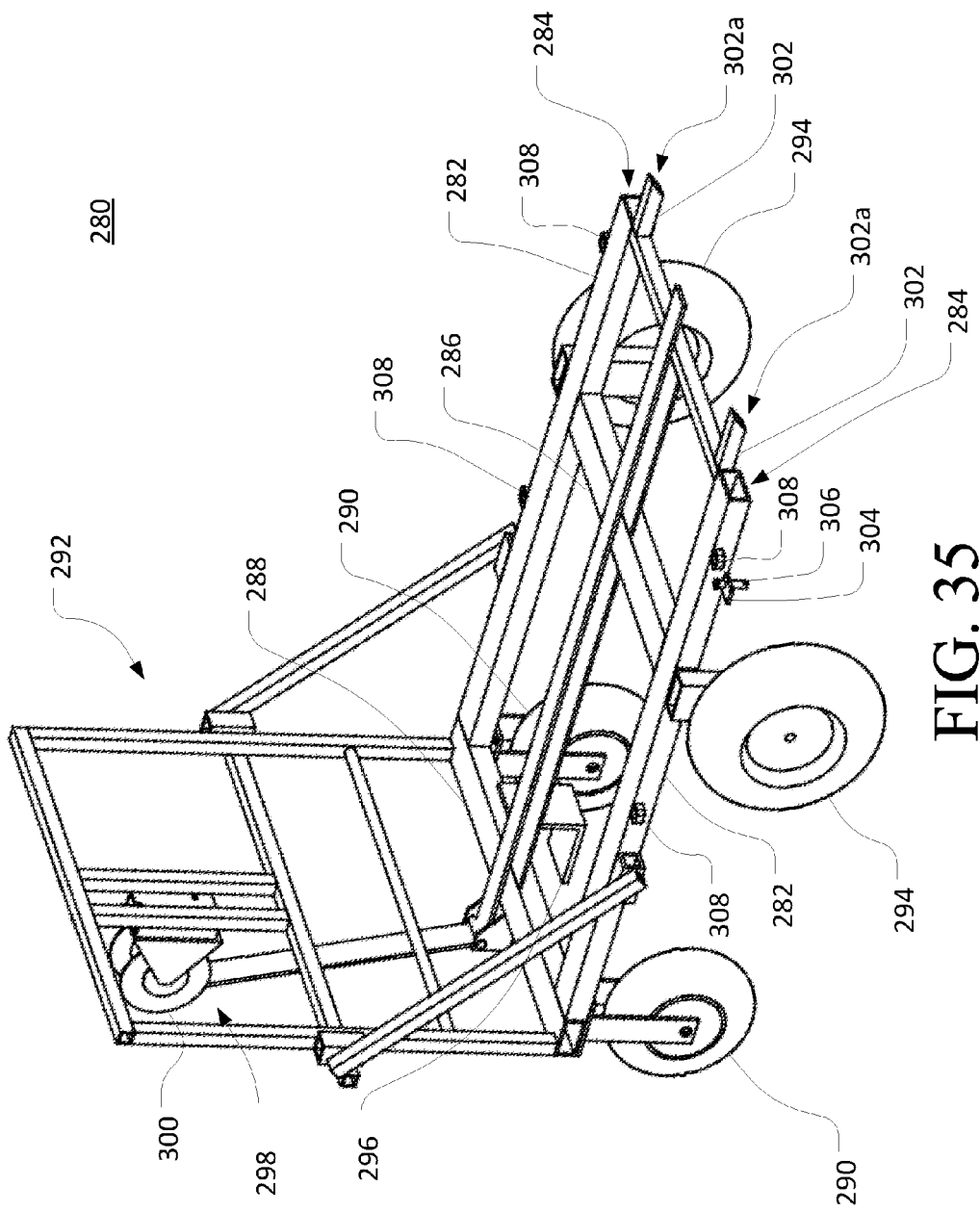
FIG. 35 is a perspective view of another example cart for use with a lift system.

FIG. 35 illustrates another cart 280 for use with the lift 30 and the platform base 240. Generally, the cart 280 is configured similarly to the cart 200, with axially disposed tubes 282 with front openings 284, cross tubes 286 and 288, relatively large rear casters 290, a handle structure 292, and so on. In contrast to the wheels 218, however, the cart 280 includes relatively large wheels 294 mounted towards the outside of the tubes 282. This can be useful, for example, to provide increased stability and maneuverability for relatively large loads.

The cart 280 also includes a rearward-facing L-bracket 296 secured to the cross tube 288, a winch assembly 298 with a manual winch 300, and a set of rigid tubes 302 with angled free ends 302a extending forward of the tubes 282. As also described below, these features can be useful for moving relatively large loads onto the support surface of the cart 280 (e.g., as formed by the tops of the tubes 282, 286 and 288. For example, in some embodiments, the rigid tubes 302 can support the cart 280 relative to the ground similarly to the support wheels 220 of the cart 200 (see, e.g., FIG. 32) as the winch assembly 298 is used to move a load onto a support surface at the tops of the tubes 282, 286, and 288. In some embodiments, the rigid tubes 302 can themselves be used to lift a load at least partly off of the ground, including through a levering action in which a downward force applied at the L-bracket 296 pivots the cart 280 about the wheels 294.

The cart 280 also includes a set of flat brackets 304 with corresponding pins 306, and a set of anchors 308 secured to the outside of the tubes 282. As also discussed below, these features can be useful for securing a load to the cart 280 and for engaging the cart 280 with the lift 30. For example, the brackets 304 and the pins 306 can be used to secure the cart 280 to a platform base of a lift, and the anchors 308 can be used to secure a load to the cart 280.

Figure 36:
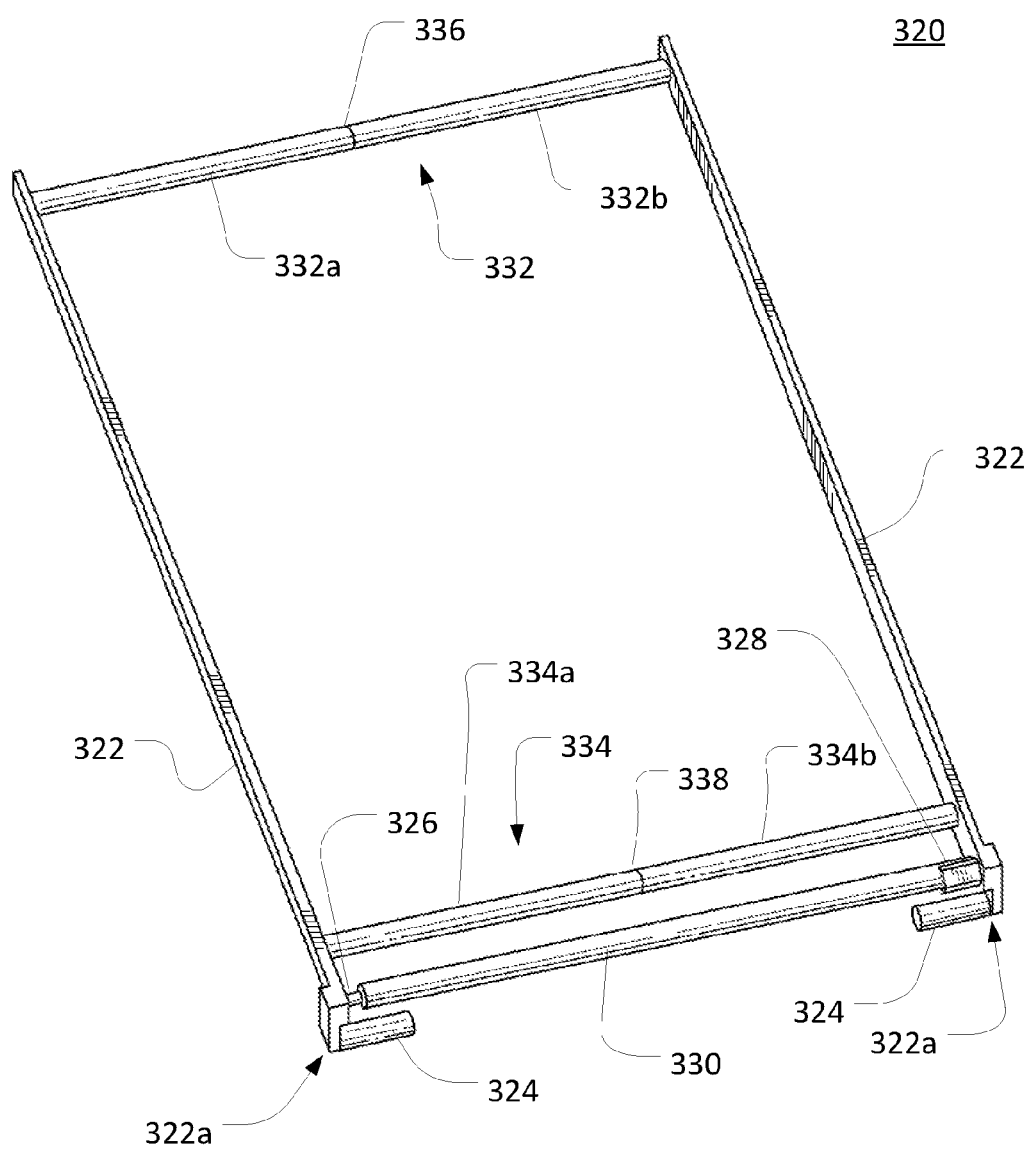
FIG. 36 is a perspective view of an example lifting frame.

In some embodiments, a lifting frame can be provided to help move relatively large or heavy loads from a support surface (e.g., the ground) onto a cart. For example, FIG. 36 illustrates a lifting frame 320 includes side members 322 extending along a length of the lifting frame 320, with cylindrical extensions 324 extending inward from reinforced ends 322a of the side members 322. A pin 326 is mounted to one of the reinforced ends 322a, and a shield 328 is mounted to the other of the reinforced ends 322, such that a tube 330 can be removably and rotatably attached to the side members 322 using the pine 326 and the shield 328.

A lifting frame can generally include engagement members configured to engage with engagement features on a load, in order to secure the lifting frame to the load. In the embodiment illustrated, for example, engagement members configured as cylindrical members 332 and 334 are secured to and extend between the side members 322. In some embodiments, the cylindrical members 332 and 334 (or other engagement members) can be removably secured to the side members 322, or can be configured to separate into multiple pieces, in order to also separate the lifting frame 320 generally. In the embodiment illustrated, the cylindrical members 332 and 334 can be separated into sub-members 332a, 332b, 334a and 334b at seams 336 and 338, respectively. The sub-members 332a, 332b, 334a, and 334b can be removably joined at the seams 336 and 338 in various ways, including, for example, with a pin-and-socket arrangement (not shown).

Figure 37:
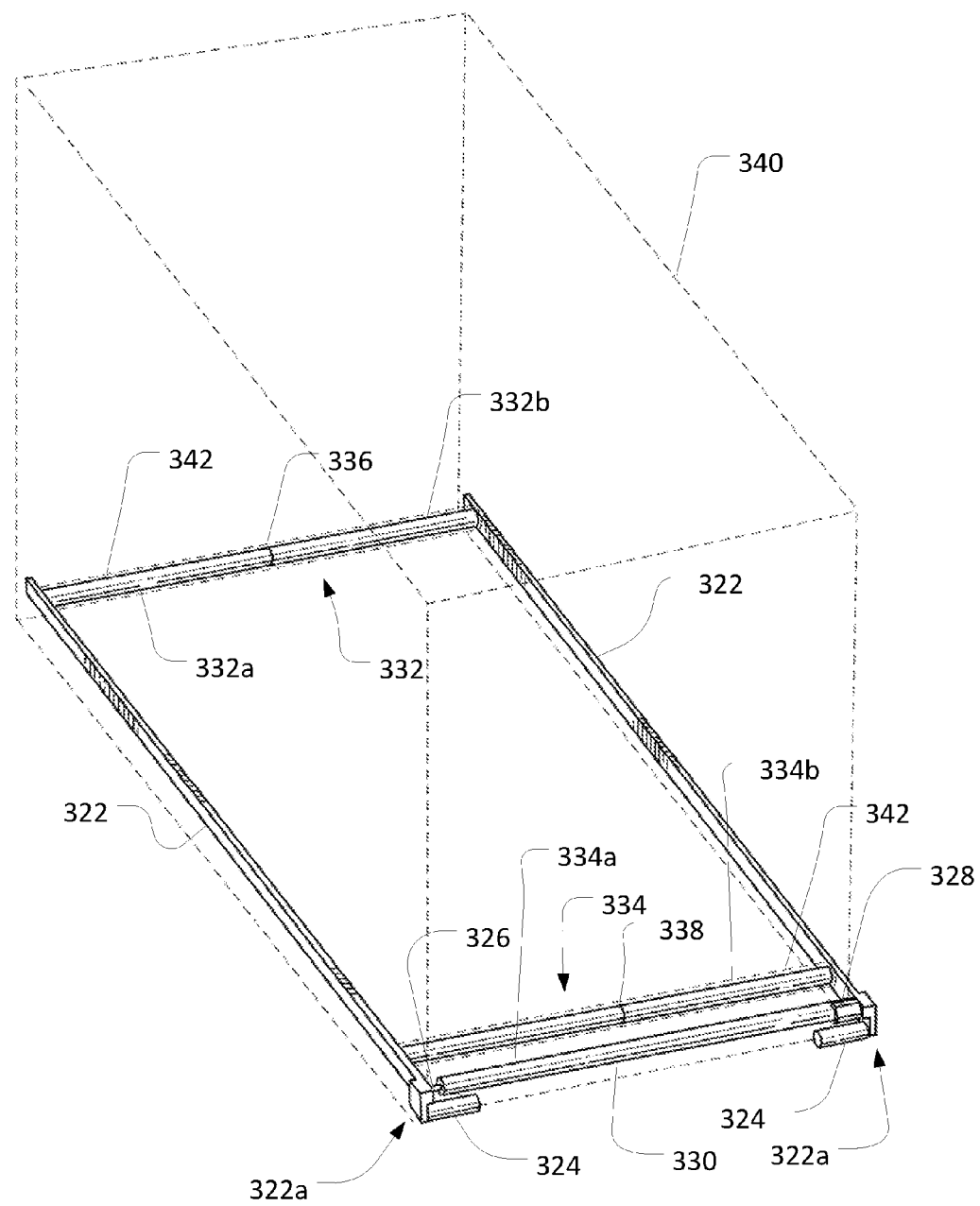
FIG. 37 is a perspective view of the lifting frame of FIG. 36 engaging a load configured as a generator.

Generally, the cylindrical members 330 and 332 (or other engagement members) can be configured to engage engagement features on a load that are configured as through-bores or similar structures. As illustrated in FIG. 37, for example, a generator 340 can be provided with bores 342 that exhibit a similar length as the cylindrical members 330 and 332. The cylindrical members 330 and 332 can accordingly be extended through (or otherwise engage) the bores 342 to secure the lifting frame 320 to the generator 340 with one of the side members 322 at either side of the generator 340, and the cylindrical extension 324 at one end of the generator 340.

Figure 38:
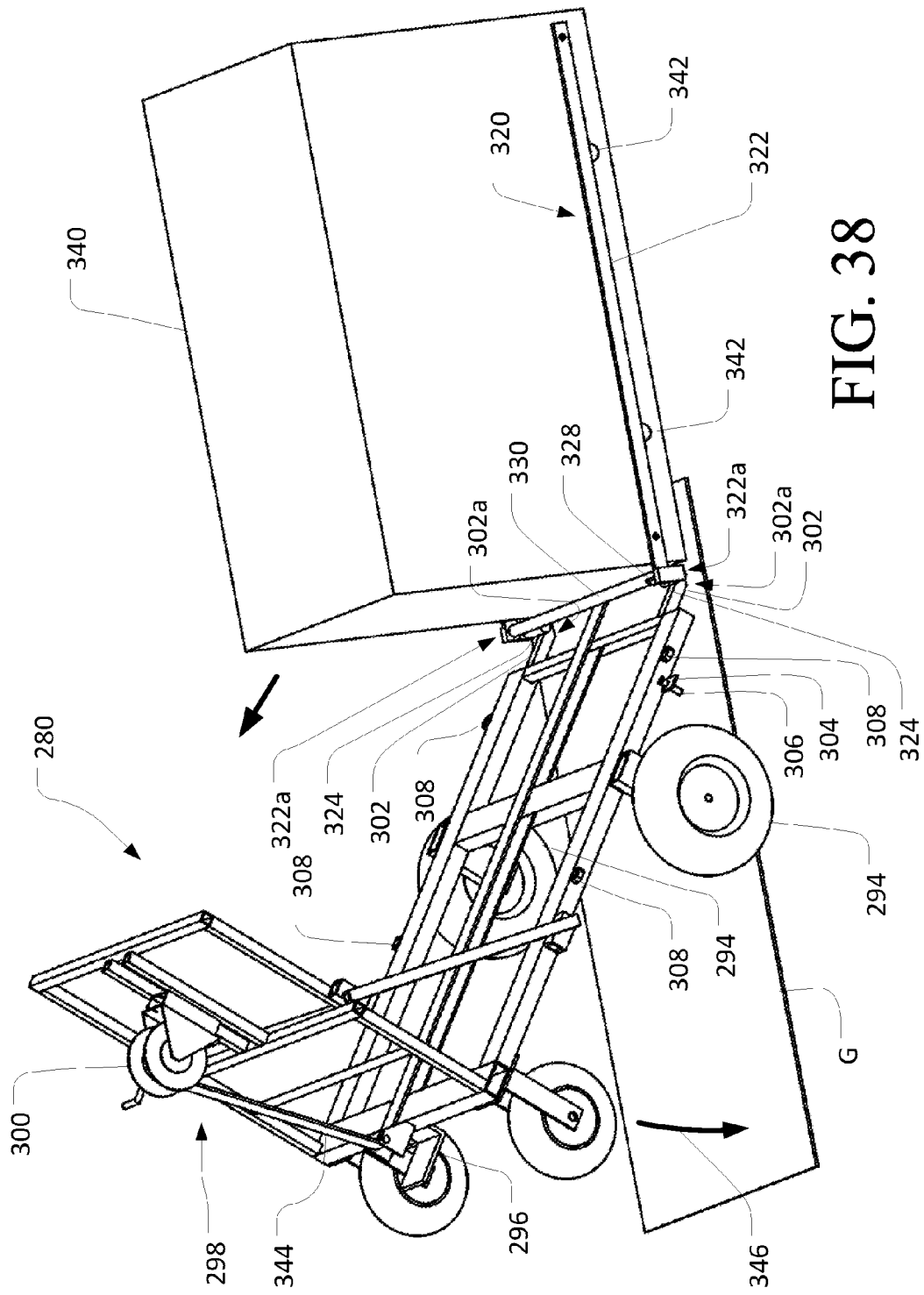
FIG. 38 is a perspective view of the cart of FIG. 35 engaging the lifting frame and load of FIG. 37 to lift the load.

As illustrated in FIG. 38, with the lifting frame 320 secured to the generator 340, the cart 280 can be positioned with the tubes 302 generally aligned with the cylindrical extensions 324 on the lifting frame 320. The cart 280 can then be tilted forward, until supported by the angled free ends 302a of the tubes 302 and the wheels 294, and moved to dispose the tubes 302 at least partly below the cylindrical extensions 324. A strap 344 of the winch assembly 298 can be secured to the tube 330 and tightened using the manual winch 300. By applying downward force at the L-bracket 296 (or other part of the rear of the cart 280), the cart can then be pivoted in a backward direction (e.g., as indicated by arrow 346), causing the tubes 302 to lift the lifting frame 320 (and the generator 340) at the cylindrical extensions 322. With the lifting frame 320 thus lifted, the manual winch 300 can be used to take up the strap 344 and thereby move the lifting frame 320 and the generator 340 onto the support surface formed by the tubes 282, 286, and 288. As desired, the generator 340 can then be secured to the cart using additional straps (not shown) or other flexible elements secured to the anchors 308.

With the generator 340 supported on the cart 280, the cart 280 can be moved to a vehicle equipped with a lift, and the lift used to raise the cart 280 and the generator 340 towards a bed of the vehicle. For example, the cart 280 can be engaged with the platform base 240 of the lift 30 similarly to the engagement of the cart 200 with the platform base 240 (e.g., as illustrated in FIGS. 30 and 31), with the brackets 252 on the platform base 240 engaging the openings 284 in the tubes 282 of the cart 280. Further, as illustrated in FIG. 39, once support members 242 of the platform base 240 have been moved to contact the cart 280, the pins 306 for the brackets 304 on the cart 280 can be engaged with the brackets 254 on the platform base 240 to further secure the cart 280 to the platform base 240.

Figure 39:
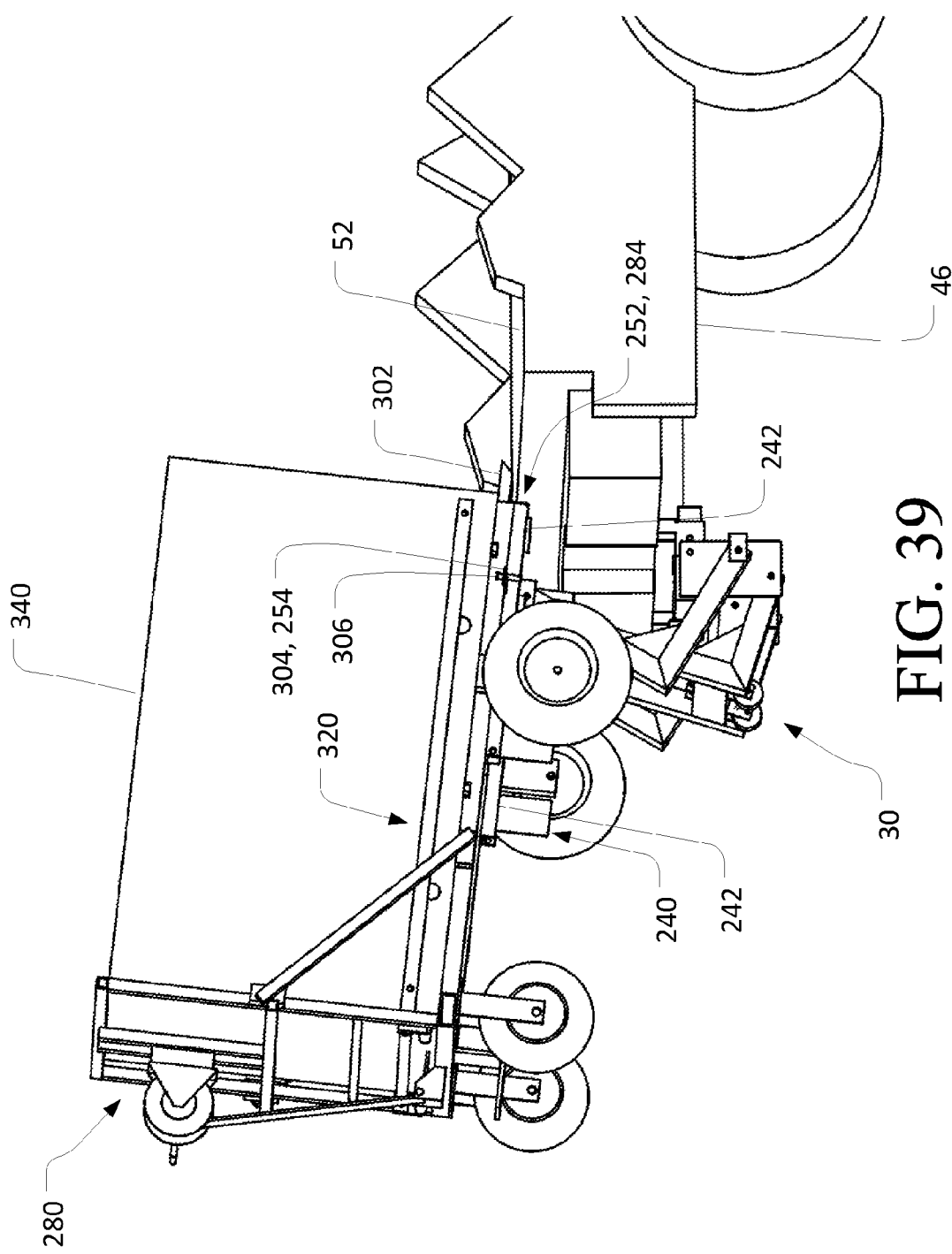
FIGS. 39 and 40 are perspective views of a loading operation using the cart of FIG. 35, the lift of FIGS. 30 and 31, and the lifting frame of FIG. 36.
Figure 40:
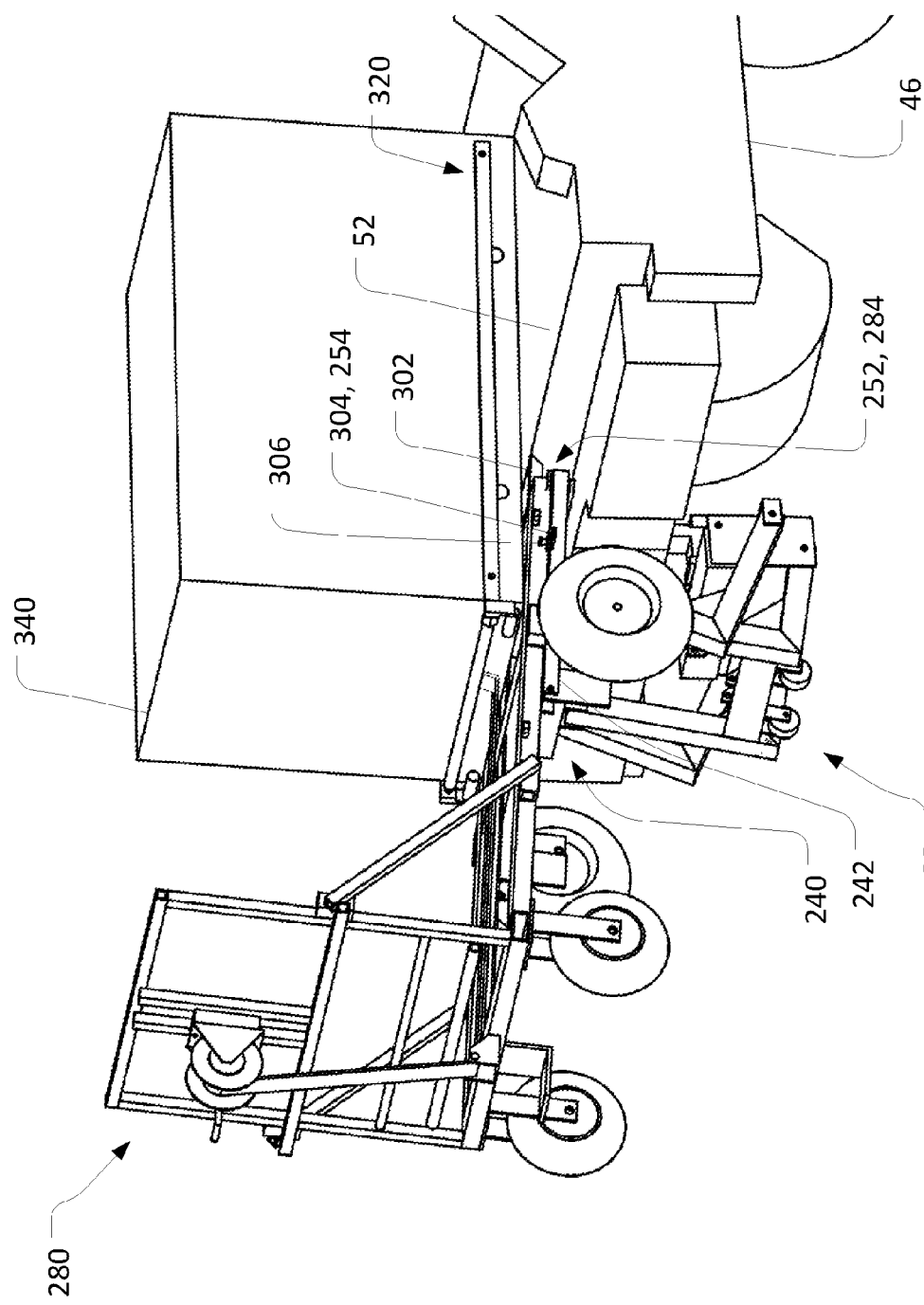

As illustrated in FIGS. 39 and 40, once the cart 280 is engaged with the platform base 240, the lift 30 can be used to raise the cart 280 and the generator 340 to a vehicle bed, such as the bed 52 of the vehicle 46. As illustrated in FIG. 40, in particular, with the lift 30 in the vehicle-loading position, the tubes 302 can provide an extended support surface to help guide and support movement of the generator 340 from the cart 280 onto the bed 52 (or from the bed 52 onto the cart 280).

Figure 41:
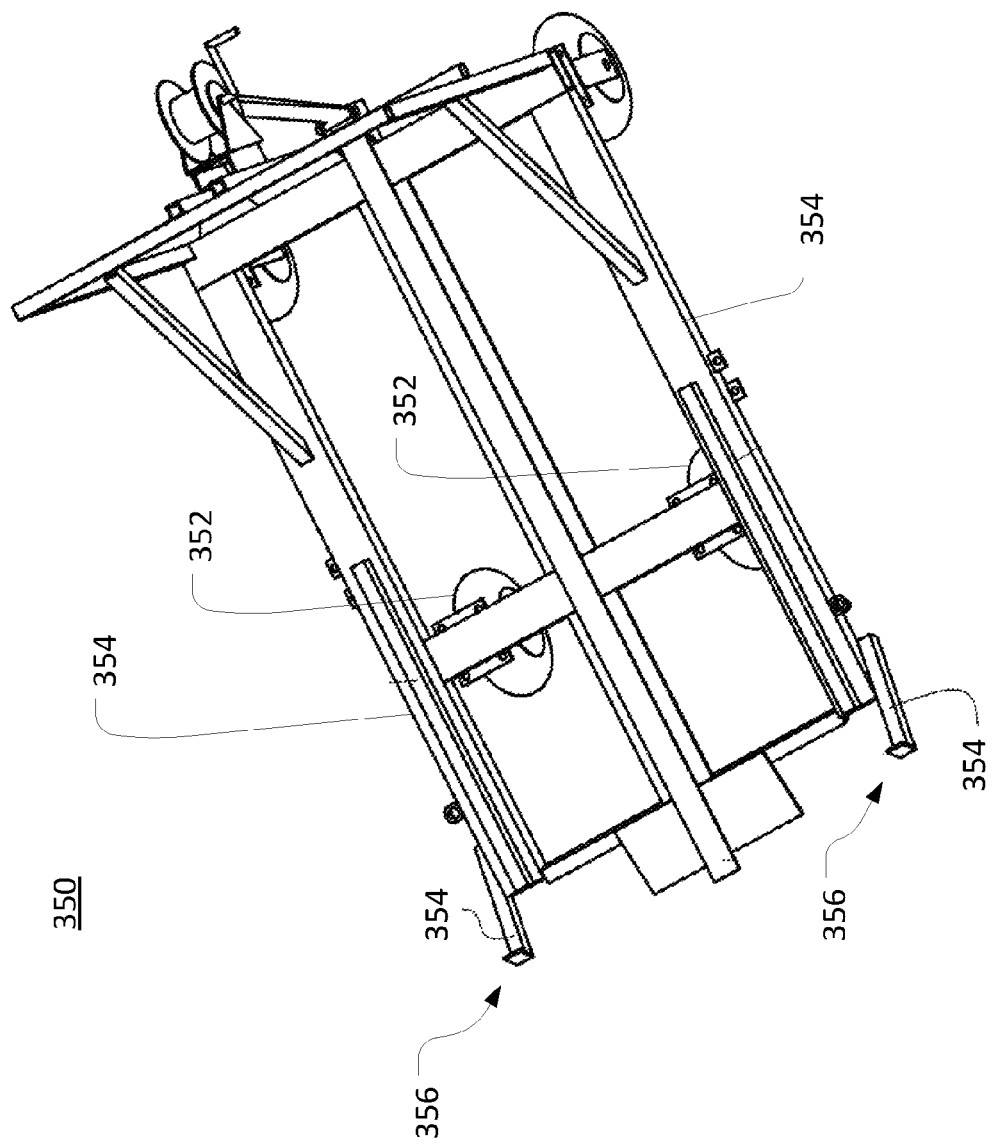
FIG. 41 is a perspective view of another example cart for use with a lift system.

In other embodiments, other configurations are possible for any number of the structures noted above. As illustrated in FIG. 41, for example, a cart 350 can be configured generally similarly to the cart 280, but can include relatively large casters 352 disposed to the inside of the axial side tubes 354. Further, the cart 350 can include rigid forward extensions configured as rigid members (e.g., tubes) 356 that angle upwards relative to the side tubes 354 and include free ends 356 with upward-facing hooks. In some embodiments, the rigid members 356 can function similarly to the tubes 302 of the cart 300 to assist in lifting a load onto the cart 350 (see, e.g., FIG. 38).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A lift system for a vehicle, the lift system comprising:
   a hitch assembly configured for removable attachment to the vehicle;
   a first support member including a first upper section rotatably secured to the hitch assembly;
   a second support member including a second upper section rotatably secured to the hitch assembly;
   a platform assembly secured at a first pivot location to a first lower section of the first support member, and secured at a second pivot location to a second lower section of the second support member;
   a lifting mechanism configured to transmit lifting force to at least one of the first support member and the second support member to move the platform assembly from a lowered, platform-loading position to a raised, vehicle-loading position; and
   at least one of a front stabilizer and a rear stabilizer;
   the front stabilizer being at least one of:
      secured to an upper side of at least one of the first support member and the second support member, the front stabilizer being disposed to contact the platform assembly forward of the first pivot location and the second pivot location to urge a forward portion of the platform assembly in an upward direction as the platform assembly approaches the platform-loading position; and
      secured to a location on the platform assembly that is forward of at least one of the first pivot location and second pivot location, the front stabilizer being disposed to contact at least one of the first support member and the second support member to urge the forward portion of the platform assembly in an upward direction as the platform assembly approaches the platform-loading position; and
   the rear stabilizer being at least one of:
      secured to a lower side of at least one of the first support member and the second support member, the rear stabilizer contacting the platform assembly rearward of the first pivot location and the second pivot location to urge the forward portion of the platform assembly in a downward direction as the platform assembly approaches the vehicle-loading position; and
      secured to a location on the platform assembly that is rearward of at least one of the first pivot location and the second pivot location, the front stabilizer contacting at least one of the first support member and the second support member to urge the forward portion of the platform assembly in a downward direction as the platform assembly approaches the vehicle-loading position.

2. The lift system of claim 1, further comprising a cart configured to removably engage the platform assembly, such that moving the platform assembly from the platform-loading position to the vehicle-loading position raises the cart.

3. The lift system of claim 2, wherein the cart includes a first attachment structure, the first attachment structure being disposed at a first height above the ground when the cart is resting on the ground;
   wherein the platform assembly includes a second attachment structure configured to engage the first attachment structure to removably engage the cart with the platform assembly, the second attachment structure being disposed at a second height above the ground that is smaller than the first height when the platform assembly is in the platform-loading position; and
   wherein, with at least part of the cart disposed above the platform assembly, moving the platform assembly from the platform-loading position towards the vehicle-loading position aligns the second attachment structure with the first attachment structure for removable engagement of the cart with the platform assembly.

4. The lift system of claim 2, wherein the platform assembly includes a platform base and a platform configured to be removably and rotatably secured to the platform base;
   wherein, with the platform removably and rotatably secured to the platform base, and with the platform assembly in the vehicle-loading position, the platform pivots upward to provide a gate for the vehicle; and
   wherein, with the platform removed from the platform base, and with the cart removably engaging the platform assembly, the platform base contacts the cart to transmit lifting force from the platform assembly to the cart.

5. The lift system of claim 2, wherein the cart includes a support surface, a first rigid member extending forward of the support surface, and a second rigid member extending forward of the support surface.

6. The lift system of claim 5, wherein the first rigid member and the second rigid member are disposed to engage a load to lift the load from a ground surface toward the support surface when the cart is resting on the ground surface and is tilted in a backward direction from a forward-tilted orientation.

7. The lift system of claim 5, wherein the first rigid member and the second rigid member engage a ground surface to support the cart when the cart is resting on the ground surface in a forward-tilted orientation.

8. The lift system of claim 5, wherein at least one of the first rigid member and the second rigid member includes a tube with an angled free end.

9. The lift system of claim 2, further comprising:
   a lifting frame for a load that includes first and second openings;
   wherein the lifting frame includes a first side member, a second side member secured to the first side member, a first engagement member secured to at least one of the first side member and the second side member and configured to engage the first opening of the load, a second engagement member secured to at least one of the first side member and the second side member and configured to engage the second opening of the load, a first extension secured to the first side member, and a second extension secured to the second side member; and
   wherein the cart is configured to engage the first extension and the second extension to move the load onto the cart.

10. The lift system of claim 9, wherein the cart includes a support surface, a first rigid member extending forward of the support surface, and a second rigid member extending forward of the support surface; and
    wherein, the first rigid member is disposed to engage the first extension of the lifting frame and the second rigid member is disposed to engage the second extension of the lifting frame to lift the load toward the support surface when the cart is tilted in a backward direction from a forward-tilted orientation.

11. The lift system of claim 2, wherein the platform assembly disposes the cart in a downward-tilted orientation, from a back-to-front perspective, over a majority of a course of travel of the platform assembly between the platform-loading position and the vehicle-loading position.

12. A lift system for moving a load onto or off of a vehicle, the lift system comprising:
a hitch assembly configured for removable attachment to the vehicle;
a first support member including a first upper section rotatably secured to the hitch assembly;
a second support member including a second upper section rotatably secured to the hitch assembly;
a platform assembly secured at a first pivot location to a first lower section of the first support member, and secured at a second pivot location to a second lower section of the second support member;
a lifting mechanism configured to transmit lifting force to at least one of the first support member and the second support member to move the platform assembly from a lowered, platform-loading position to a raised, vehicle-loading position; and
a cart configured to support the load and to removably engage the platform assembly, such that moving the platform assembly from the platform-loading position to the vehicle-loading position raises the cart and the load;
the cart including a support surface, a first rigid member extending forward of the support surface, and a second rigid member extending forward of the support surface;
the first rigid member and the second rigid member being disposed to engage a load to lift the load from a ground surface toward the support surface, when the cart is resting on the ground surface and is tilted in a backward direction from a forward-tilted orientation; and
the first rigid member and the second rigid member being disposed to engage the ground surface to support the cart, when the cart is resting on the ground surface in a forward-tilted orientation.

13. The lift system of claim 12, wherein the cart includes a first attachment structure, the first attachment structure being disposed at a first height above the ground when the cart is resting on the ground;
wherein the platform assembly includes a second attachment structure configured to engage the first attachment structure to removably engage the cart with the platform assembly, the second attachment structure being disposed at a second height above the ground that is smaller than the first height when the platform assembly is in the platform-loading position; and
wherein, with at least part of the cart disposed above the platform assembly, moving the platform assembly from the platform-loading position towards the vehicle-loading position aligns the second attachment structure with the first attachment structure for removable engagement of the cart with the platform assembly.

14. The lift system of claim 13, wherein the first attachment structure includes a rigid member with an opening;
wherein the second attachment structure includes a bracket extending at least partly upward and at least partly rearward; and
wherein the bracket extends into the opening to removably engage the cart with the platform assembly.

15. The lift system of claim 12, wherein the platform assembly disposes the cart in a downward-tilted orientation, from a back-to-front perspective, over a majority of a course of travel of the platform assembly between the platform-loading position and the vehicle-loading position.

16. The lift system of claim 12, wherein at least one of the first rigid member and the second rigid member includes a tube with an angled free end.

17. A lift system for lifting a cart and a load relative to a vehicle, the lift system comprising:
a hitch assembly configured for removable attachment to the vehicle;
a first support member including a first upper section rotatably secured to the hitch assembly;
a second support member including a second upper section rotatably secured to the hitch assembly;
a platform assembly secured at a first pivot location to a first lower section of the first support member, and secured at a second pivot location to a second lower section of the second support member; and
a lifting mechanism configured to transmit lifting force to at least one of the first support member and the second support member to move the platform assembly from a lowered, platform-loading position to a raised, vehicle-loading position;
the platform assembly including a platform base, and a platform for the load, the platform being configured to be removably and rotatably secured to the platform base;
with the platform removably and rotatably secured to the platform base, and with the platform assembly in the vehicle-loading position, the platform pivoting upward from a support position for the load to provide a gate for the vehicle;
with the platform removed from the platform base, the platform base providing a first support surface for lifting the cart; and
with the platform assembly disposes the cart in a downward-tilted orientation, from a back-to-front perspective, over a majority of a course of travel of the platform assembly between the platform-loading position and the vehicle-loading position.

18. The lift system of claim 17, further comprising:
the cart;
wherein the cart includes a support structure configured to support the load and to removably engage the platform base, a first rigid member extending forward of the support structure, and a second rigid member extending forward of the support structure;
wherein the first rigid member and the second rigid member are disposed to engage a load to lift the load from a ground surface toward the vehicle when the cart is resting on the ground surface and is tilted in a backward direction from a forward-tilted orientation; and
wherein the first rigid member and the second rigid member engage the ground surface to support the cart when the cart is resting on the ground surface in the forward-tilted orientation.

* * * * *